United States Patent
Bell et al.

(10) Patent No.: US 7,971,202 B2
(45) Date of Patent: Jun. 28, 2011

(54) METHOD FOR ADVANCED MANAGEMENT OF SOFTWARE DISTRIBUTION TASKS

(75) Inventors: Denise Ann Bell, Austin, TX (US); Arnaud Airy Mathieu, Austin, TX (US); Andrei Oprea, Ajax (CA); Cristina L. Tecsa, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 1506 days.

(21) Appl. No.: 11/375,505

(22) Filed: Mar. 14, 2006

(65) Prior Publication Data
US 2007/0220510 A1    Sep. 20, 2007

(51) Int. Cl.
*G06F 9/445*    (2006.01)
(52) U.S. Cl. ........ 717/172; 717/168; 717/169; 717/174; 717/175
(58) Field of Classification Search .................. 717/172, 717/177
See application file for complete search history.

(56) References Cited

U.S. PATENT DOCUMENTS

| | | | |
|---|---|---|---|
| 5,666,501 A * | 9/1997 | Jones et al. | 715/748 |
| 6,006,035 A * | 12/1999 | Nabahi | 717/175 |
| 7,206,828 B1 * | 4/2007 | Bourke-Dunphy et al. | 709/221 |
| 2002/0120659 A1 | 8/2002 | Parry | |
| 2004/0010586 A1 | 1/2004 | Burton et al. | |
| 2007/0050750 A1 * | 3/2007 | Bykov et al. | 717/100 |

FOREIGN PATENT DOCUMENTS
DE    10249611 B3    10/2002

* cited by examiner

*Primary Examiner* — Thomas K Pham
(74) *Attorney, Agent, or Firm* — Yee & Associates, P.C.; Jeffrey S. LaBaw

(57) ABSTRACT

The present invention provides a computer implemented method, apparatus, and computer usable program code for managing a software installation. A graphical user interface is displayed for receiving user input to manage a software installation having multiple software installation tasks. A particular software installation task is initiated in response to the particular software installation task being selected from the multiple software installation tasks. The performance of the particular task is customized based on the selection of the option in response to a selection of an option during execution of the particular software installation task is received. At least one of the multiple software installation tasks may be scheduled and initiated independently from others of the multiple software installation tasks.

19 Claims, 31 Drawing Sheets

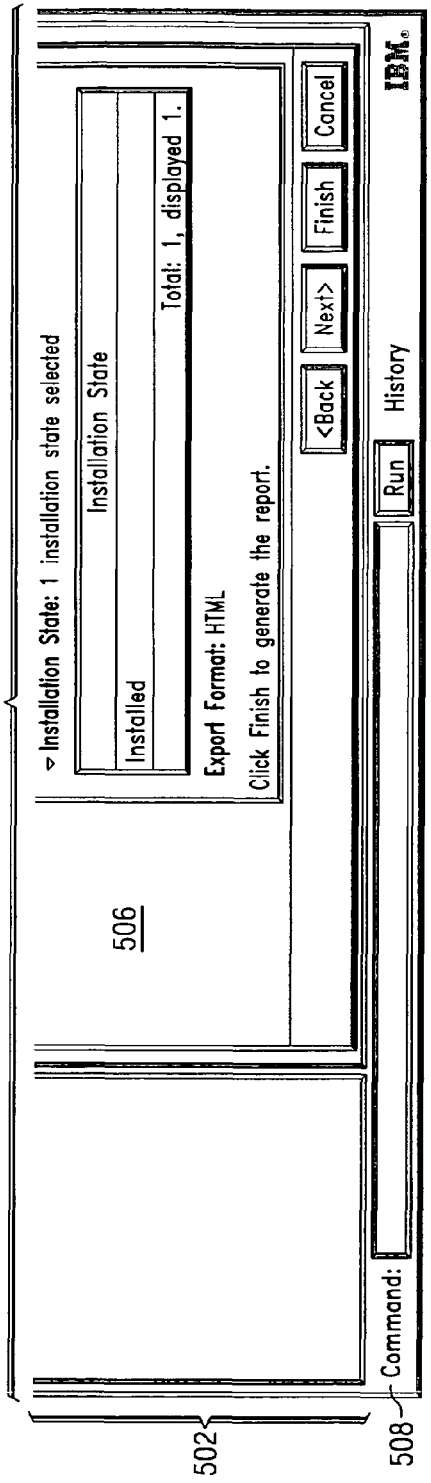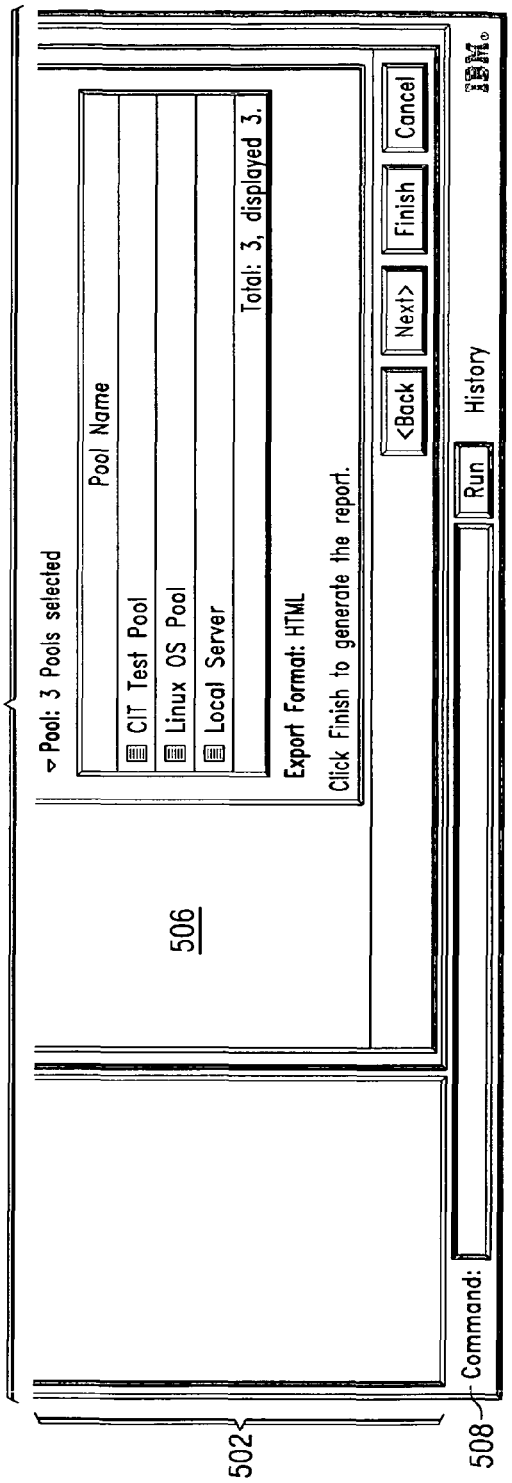

METHOD FOR ADVANCED MANAGEMENT OF SOFTWARE DISTRIBUTION TASKS

BACKGROUND OF THE INVENTION

1. Field of the Invention

The present invention relates generally to an improved data processing system and in particular, to a computer implemented method, apparatus, and computer usable program code for updating or maintaining software in a network data processing system. Still more particularly, the present invention relates to a computer implemented method, apparatus, and computer usable program code for dynamic segmentation of software importing, distributing, installing, and verifying compliance.

2. Description of the Related Art

Reliance on software has grown exponentially in recent years because of the increased use of computing devices in every aspect of business and society. Users have come to rely on software. With the reliance, a need exists for the software to be properly maintained and updated for the user's individual hardware and respective endeavors. Software developers frequently provide patches, updates, and new software offerings as products are further developed and as new needs and problems arise. Most customers access new software, updates, and patches through the Internet or through another data network.

With current systems, updates and maintenance frequently involves extensive coordination of administrators, managers, and information technology personnel as well as the associated expenses. Additionally, system downtime, installation problems, and scheduling can take a toll on the updating user.

For example, information technology (IT) administrators of software customers may have to initiate contact with a supplier site to identify new updates for existing products by checking a supplier website to see if new patches exist for each one of the products that the customer currently uses. Then, the customer is required to read the install notes to see if any prerequisites or dependencies are present for the patch prior to installation. Once the customer has verified this information, the patch is then downloaded to the desired machine and installed. Downloading the software patch and installing it may require extensive amounts of time and processing resources for each task.

Current distribution and installation procedures are error prone due to software conflicts and relationships, resource pools, application tiers, and overall complexity. As a result, most software update and maintenance efforts are problematic and inefficient.

SUMMARY OF THE INVENTION

The present invention provides a computer implemented method, apparatus, and computer usable program code for managing a software installation. A graphical user interface is displayed for receiving user input to manage a software installation having multiple software installation tasks. A particular software installation task is initiated in response to the particular software installation task being selected from the multiple software installation tasks. The performance of the particular task is customized based on the selection of the option in response to a selection of an option during execution of the particular software installation task is received. At least one of the multiple software installation tasks may be scheduled and initiated independently from others of the multiple software installation tasks.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4O is a diagram of a graphical user interface for presenting a user with information regarding software installation in accordance with an illustrative embodiment of the present invention;

FIG. 5H-1 is a diagram of a graphical user interface for presenting a user with compliance verification status information in accordance with an illustrative embodiment of the present invention;

FIG. 5H-2 is a diagram of a graphical user interface for presenting a user with compliance verification status information in accordance with an illustrative embodiment of the present invention;

FIG. 5I-1 is a diagram of a graphical user interface for presenting a user with compliance verification status information in accordance with an illustrative embodiment of the present invention;

FIG. 5I-2 is a diagram of a graphical user interface for presenting a user with compliance verification status information in accordance with an illustrative embodiment of the present invention;

DETAILED DESCRIPTION OF THE PREFERRED EMBODIMENT

Figure 1:
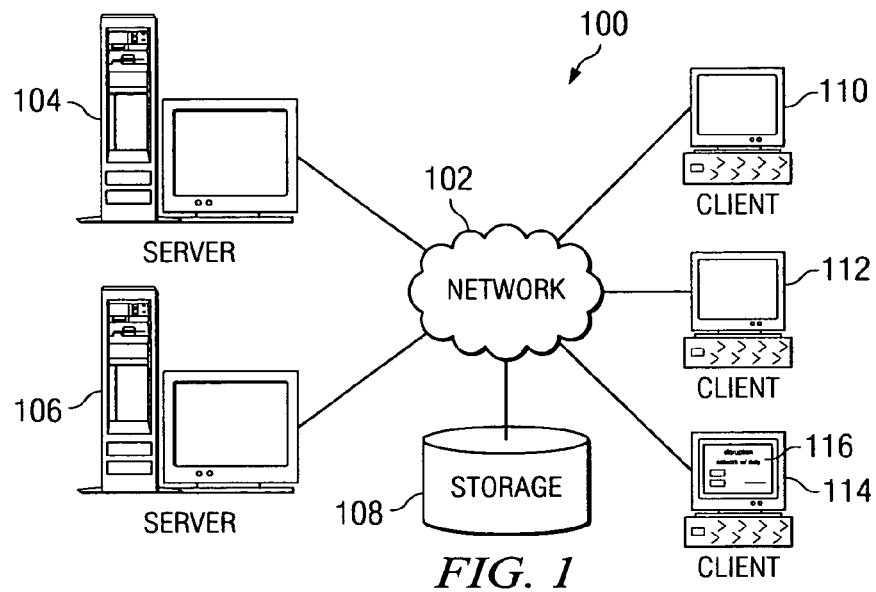
FIG. 1 is a pictorial representation of a network of data processing systems in which aspects of the present invention may be implemented.
Figure 2:
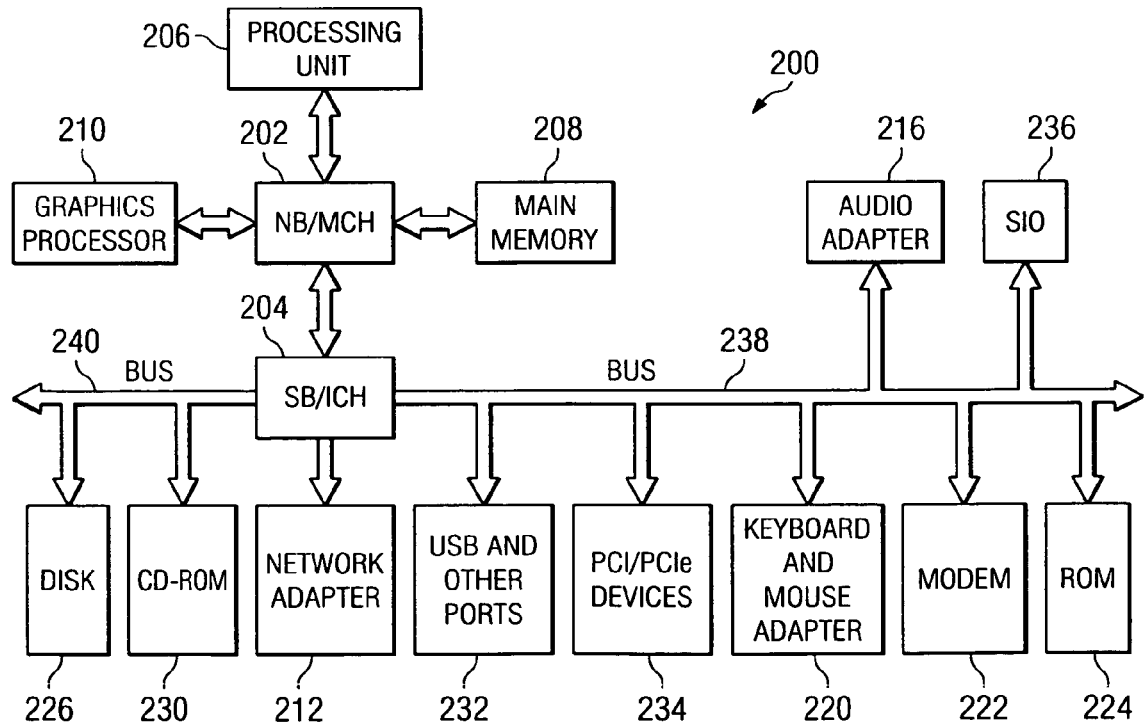
FIG. 2 is a block diagram of a data processing system in which aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

Data processing systems are capable of communicating information to users in many formats, including, for example, text, graphics, sounds, animated graphics, synthesized speech, and video. The software distribution application employs a data processing system to combine such information formats into a coherent and comprehensive presentation to the users.

As a result of the increasing complexity of data processing systems and with the introduction of multimedia presentations, attempts have been made to simplify the interface between a user and the large amounts of data present within a modern data processing system. One example of an attempt to simplify the interface between a user and a data processing system is the utilization of so-called graphical user interface (GUI) 116 to provide an intuitive and graphical user interface between the user, such as client 114 and the data processing system. Graphical user interface 116 is an interface system, including devices by which a user interacts with a system, system components, and/or system applications via windows or view ports, icons, menus, pointing devices, electronic pens, touch screens, and other input devices. Information may be both input and viewed by an administrative user and individual users using graphical user interface 116.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments of the present invention are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

The different embodiments of the present invention provide a computer implemented method, apparatus, and computer usable program code for software management. Aspects of the present invention manage software with dynamic segmentation of software importing, distributing, installing, and verifying compliance which are each broken down into specific tasks. A user is able to separate and manage the different parts of software acquisition or updates based on workflow, complexity, time availability, relationships, and other individualized environmental factors. As a result, the user has more options and flexibility for ensuring that the distribution and installation of software occurs properly. The method and apparatus described herein is referred to generically as software management. The user, as used herein, refers to administrators, managers, and information technology personnel or individual users who receive the distributed software for installation. The actions that may be taken by a number of users is configurable. In one example, importing is performed globally, by a centralized user, while distribution and installation may only be performed by users that have been granted the appropriate access rights for the given systems.

The software management system herein described may be a commercially available software management system such as Tivoli®, Tivoli Intelligent Orchestrator (TIO) or Tivoli Provisioning Manager (TPM), which are products available from International Business Machines Corporation. Tivoli and various Tivoli derivatives are trademarks of International Business Machines Corporation in the United States, other countries, or both.

Figure 3:
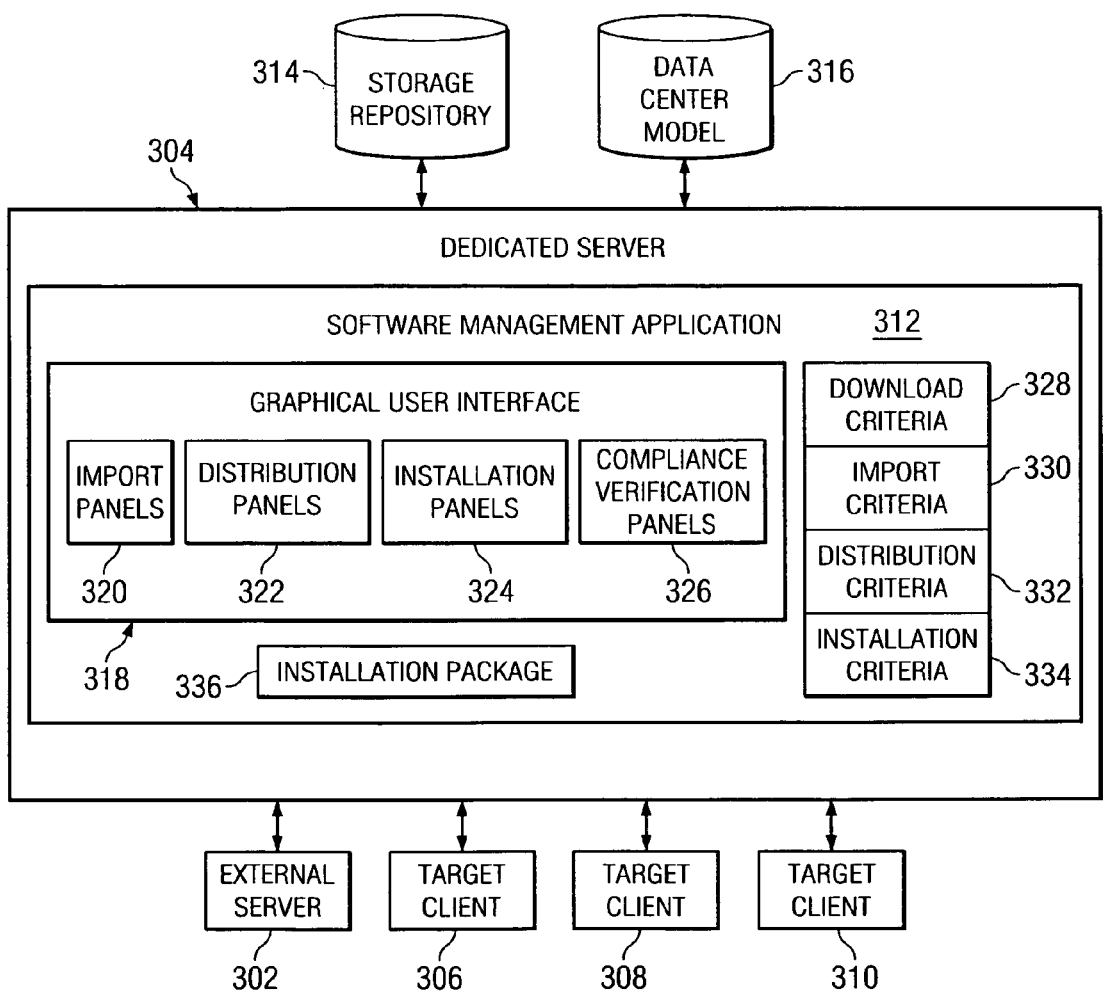
FIG. 3 is a block diagram of server and client system in which aspects of the present invention may be implemented.

FIG. 3 is a block diagram of a server and client data processing system in which aspects of the present invention may be implemented. FIG. 3 shows data flow between external server 302 which is accessed to retrieve software, dedicated server 304 which is used to perform the software management, and target clients 306, 308, and 310 on which the software is installed.

External server 302 illustrated in FIG. 3 may be a server, such as server 104 of FIG. 1. Dedicated server 304 may be a server, such as server 106 of FIG. 1. Target clients 306, 308, and 310 may be clients, such as clients 110, 112, and 114 of FIG. 1. External server 302 houses the new software, updates, patches, fixes, or miscellaneous software to be downloaded to be installed on dedicated server 304 and target clients 306, 308, and 310. There may be any number of target clients from one to thousands.

Software management application 312 is stored and run on dedicated server 304. Software management application 312 manages the controlled downloading of software from external server 302 to storage repository 314. Storage repository 314 is any storage medium networked to dedicated server 304 that allows information and software to be stored. In one example, storage repository 314 may be a high-capacity disk drive or interconnected disk drives. In another example, storage repository 314 may be a tape drive storage system. In another example, storage repository 314 may be housed in dedicated server 304.

Software downloaded to storage repository 314 may be outside a network firewall. The software is imported so that the software may be brought within the firewall. Importing, as herein defined, is naming, defining, and otherwise configuring software so that it can be successfully recognized and accepted by devices within a system or network.

Data center model 316 is operably connected to dedicated server 304 and may incorporate the historical data and the hardware and software relationships that are supported by software management application 312. For example, data center model 316 may include information regarding software versions, software updates, hardware, device drivers, and other information regarding dedicated server 304 and target clients 306, 308, and 310. As devices, such as target clients 306, 308, and 310 are updated, those changes are recorded and archived so that they are easily accessed by software management application 312. Data center model 316 effectively contains an inventory of all the hardware and software elements of a network system.

Software management application 312 displays information to a user on graphical user interface 318. Graphical user interface 318 displays import panels 320, distribution panels 322, installation panels 324, and compliance verification panels 326 to the user. These different panels include many different display screens, text, graphics, icons, tables, menus, and other graphical means providing the user information and options and prompting the user to make selections and enter information. The user may use a keyboard, mouse, touch screen, trackball, or input output device to input information and make the desired selections.

Graphical user interface 318 allows a user to input information selecting which segment to begin. The general segments may include import, distribute, install, and verify compliance status. Within each segment various tasks are performed in order to successfully complete the segment. Each task may require input or criteria from the user in order to successfully complete the tasks within each segment. A task index displayed on graphical user interface may indicate which segment and task is being performed. As tasks are performed and segments implemented, those changes are recorded by data center model 316 so that they can be recalled as needed. The history of software installation is recorded so that it can be retrieved from data center model 316 by software management application 312 as needed. Segments may be performed at different times allowing software management application 312 to be extremely flexible.

The panels allow software management application 312 to obtain download criteria 328, import criteria 330, distribution criteria 332, and installation criteria 334. The different criteria specify every aspect of the software download and import, distribution, installation, and verification. The criteria may specify whether the desired action is to occur when manually specified, automatically, or at a specified time.

For example, distribution criteria 332 may specify that target clients 306 and 308 are to receive one software update "A" at 8:00 a.m. while target client 310 is to receive software update "B" at 10:00 a.m. of a specified day.

Software management application 312 creates installation package 336 that is distributed to target clients 306, 308, and 310 when updates are to be installed. Installation package 336 is preferably a workflow wrapper or script that will be executed by the target client so that the software will be installed as soon as it is executed, at a designated time, or at a time chosen by a user using the target client. Installation package 336 allows a central user to control installation on a number of clients.

Figure 4A:
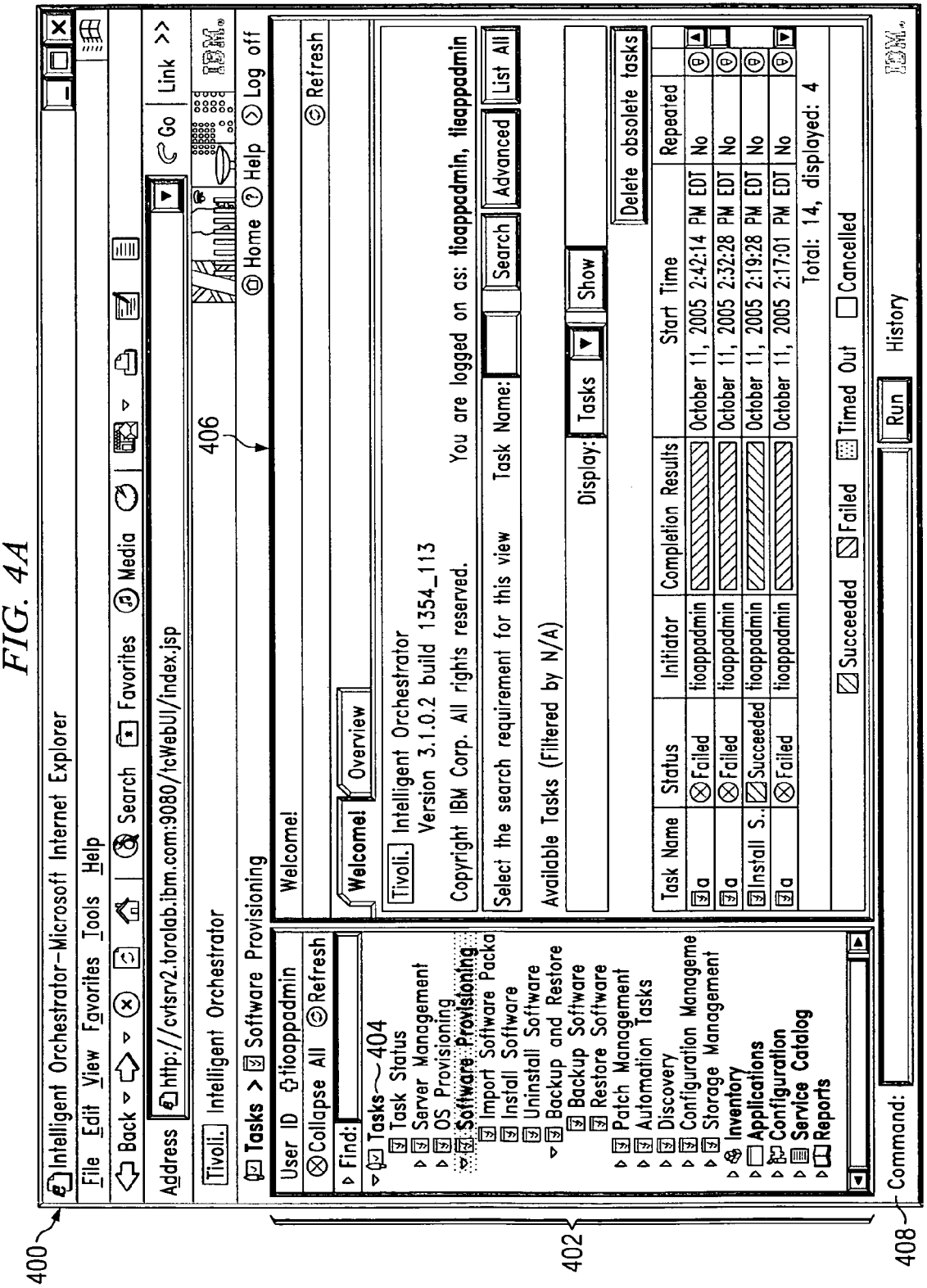
FIG. 4A is a diagram of a graphical user interface for presenting a user with options for displaying active tasks in accordance with an illustrative embodiment of the present invention.

FIG. 4A is a diagram of a graphical user interface for presenting a user with options for displaying active tasks in accordance with an illustrative embodiment of the present invention. Window 400 illustrates an interface that is presented to a user for receiving user input as to what action is to be taken. Window 400 may be displayed to a user on a graphical user interface such as graphical user interface 318 of FIG. 3 in order to receive user input and present information to the user in a software management program such as software management application 312 of FIG. 3.

Window 400 contains first pane 402 which includes task index 404, an expandable drop down list that allows a user to select different tasks to perform in the software management application. Task index 404 highlights the action being performed and dynamically changes within first pane 402 based on the action being performed. In this example, the user has selected software provisioning from task index 404. The user input results in second pane 406 being displayed in window 400. In this example, first pane 402 is displayed on the left portion and second pane 406 is displayed on the right portion of window 400.

Based on the selected task, second pane 406 contains a list of tasks so that the user can evaluate the progress of tasks and determine if he would like to initiate a new action to import, distribute, install, or verify compliance status. In this example, each task includes information such as the task name, status, initiator, completion results, start time, and whether the task has been repeated. Second pane 406 also allows a user to search for tasks by entering a keyword. Window 400 includes command entry line 408 so that the user can enter initiate a task as needed. The user may initiate a task by entering a command in command entry line 408 associated with a specific task.

In second pane 406 a list of tasks, status, initiator, completion results, start time, and whether the task has been repeated is displayed. The displayed information allows the user to quickly evaluate which software tasks are finished, being processed, or have problems in order to be able to make a decision regarding the initiation of new tasks.

The information or options presented to the user in first pane 402 and second pane 406 are not fixed but rather are progressive in response to input received from the user. In some cases, different steps or options may not need to be presented to a user based on previous input. For example, a user that indicates that the distribution is for a single device may not have to enter further information regarding target systems for installation.

Figure 4B:
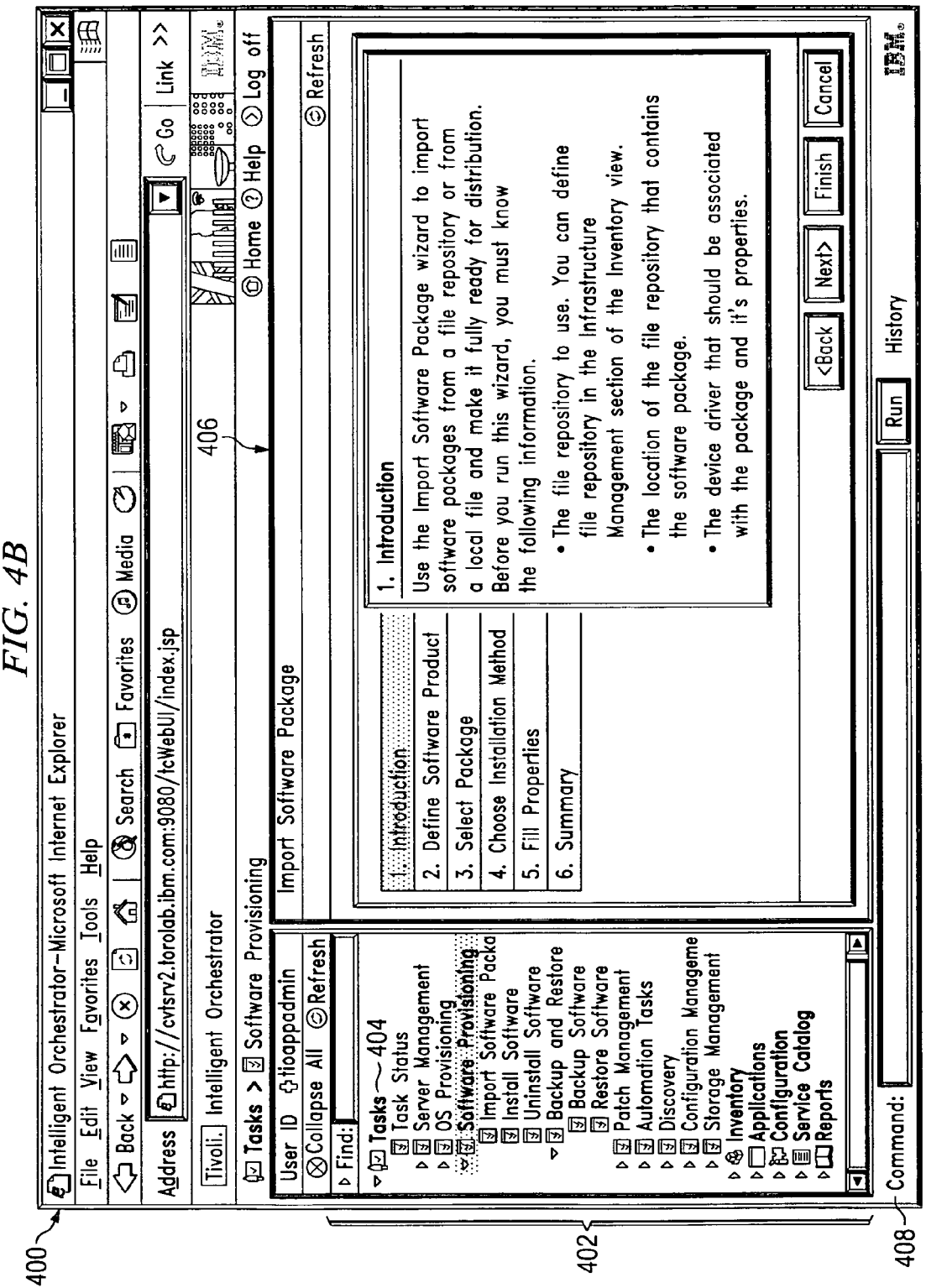
FIG. 4B is a diagram of a graphical user interface for presenting a user with information for obtaining import criteria from a user in accordance with an illustrative embodiment of the present invention.

FIG. 4B is a diagram of a graphical user interface for presenting a user with information for obtaining import criteria from a user in accordance with an illustrative embodiment of the present invention. The example screen of display depicted in FIG. 4B is an example of information that may be presented to a user in an import panel, such as import panels 320 of FIG. 3 in order to obtain import criteria, such as import criteria 330 of FIG. 3. For example, in second pane 406, the user is prompted to identify a file repository from which software can be imported and prepared for distribution. Second pane 406 also includes information prompting the user to know the file repository, location, and device driver that should be associated with the software and software properties.

Figure 4C:
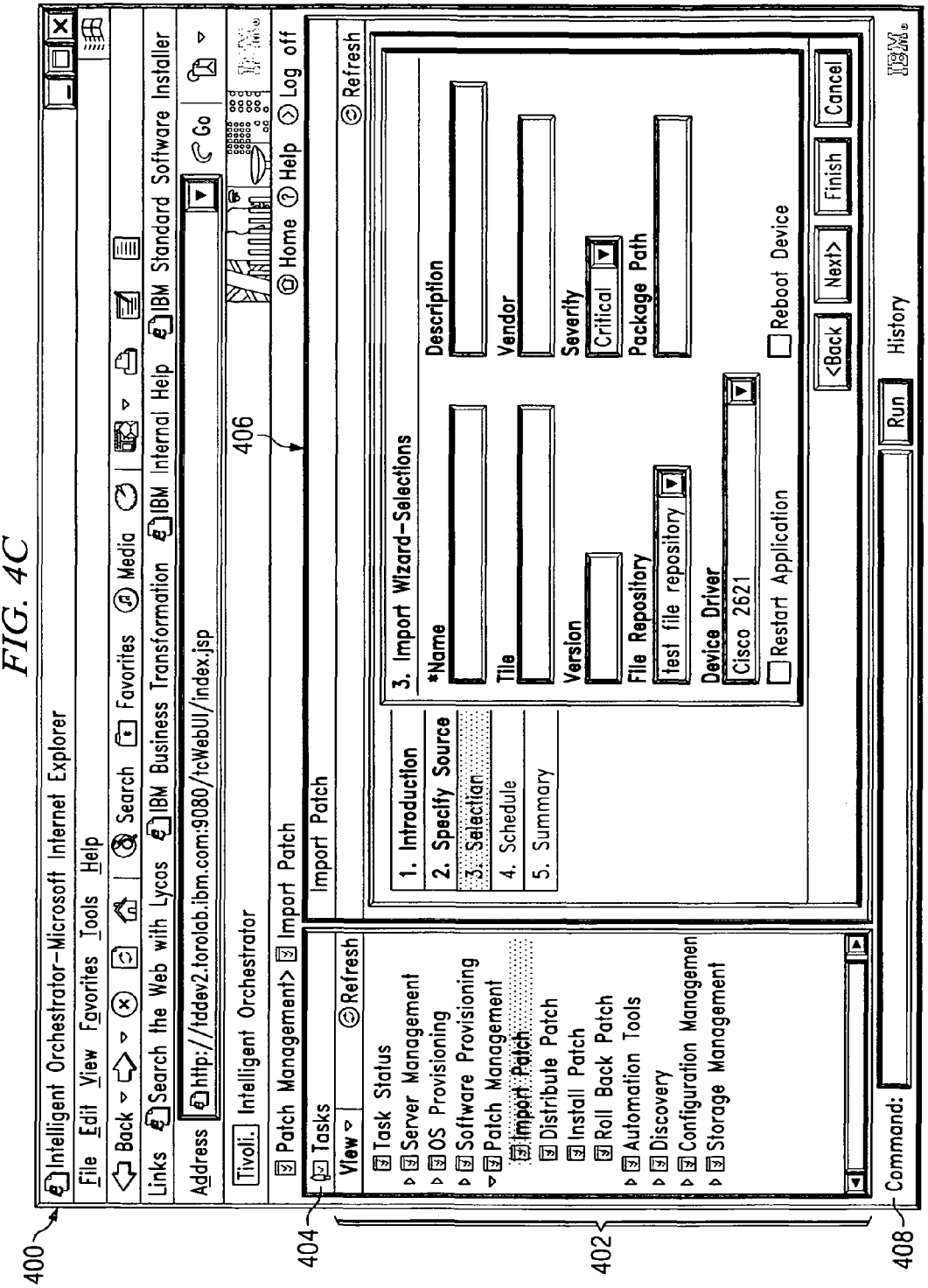
FIG. 4C is a diagram of a graphical user interface for presenting a user with options for obtaining import criteria from a user in accordance with an illustrative embodiment of the present invention.

FIG. 4C is a diagram of a graphical user interface for presenting a user with options for obtaining import criteria from a user in accordance with an illustrative embodiment of the present invention. FIG. 4C is an example of information or fields that may be presented to a user in window 400 in order to obtain import criteria, such as import criteria 330 of FIG. 3. First pane 402 shows that the user is in an import panel. Second pane 406 provides exemplary fields for entering the name of the software update, description, title, vendor name, software version, priority, file repository, package path, and device driver among other criteria. This information is used to successfully import the software so that it can be identified on a distributed system by various devices. Additionally, the fields help identify which target clients will eventually receive the update and identify how important the software is.

Figure 4D:
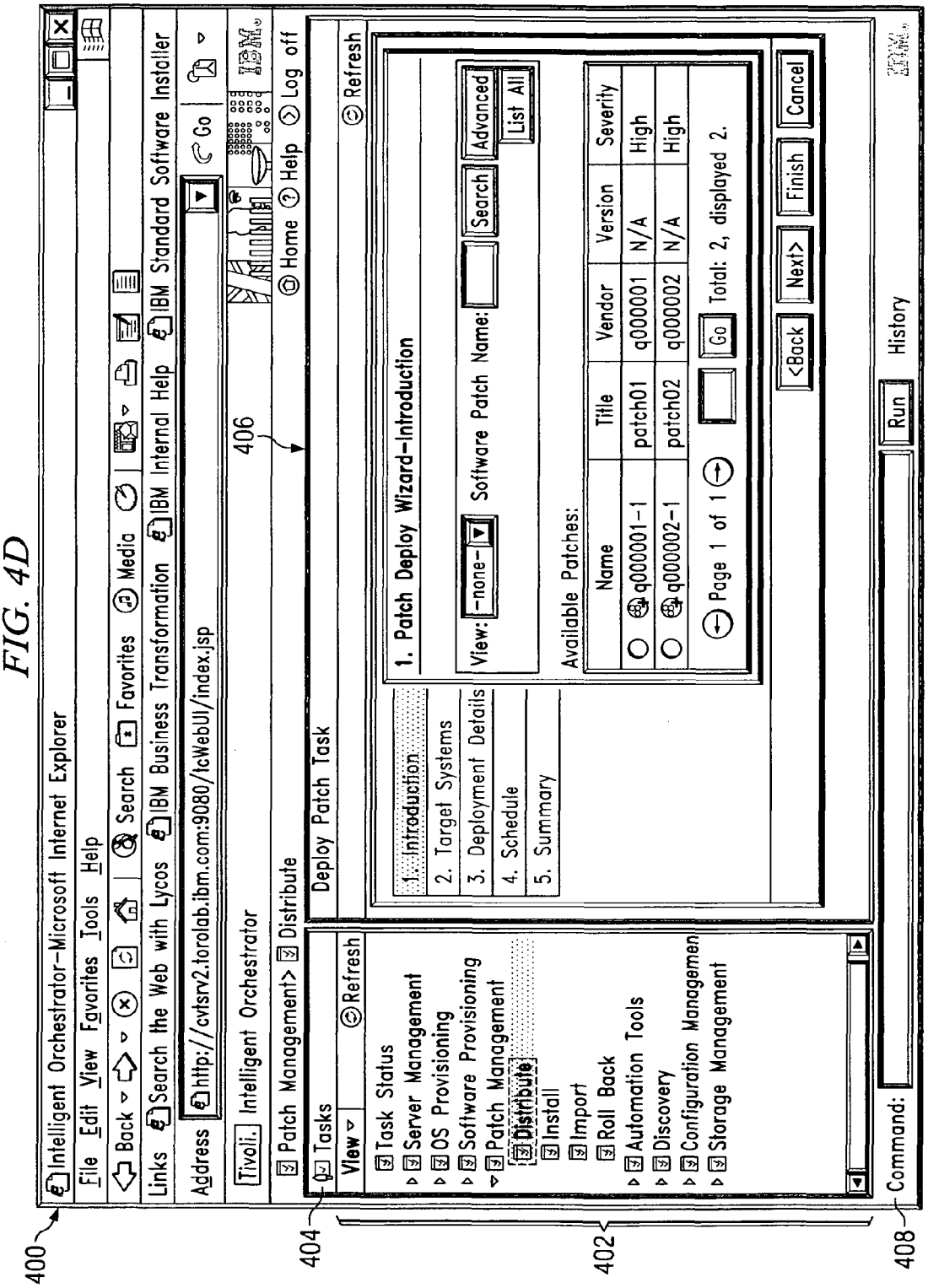
FIG. 4D is a diagram of a graphical user interface for presenting a user with options for obtaining distribution criteria in accordance with an illustrative embodiment of the present invention.

FIG. 4D is a diagram of a graphical user interface for presenting a user with options for obtaining distribution criteria in accordance with an illustrative embodiment of the present invention. First pane 402 shows that the user is in the distribution panels. Second pane 406 of window 400 shows options that may be presented to a user in order to obtain distribution criteria such as distribution criteria 332 of FIG. 3. Exemplary distribution information may include a list of available software patches, software patches that have been distributed, and software updates that need to be distributed. Additionally, the user may be able to search through available patches by searching for the software name or a portion of the software name.

Figure 4E:
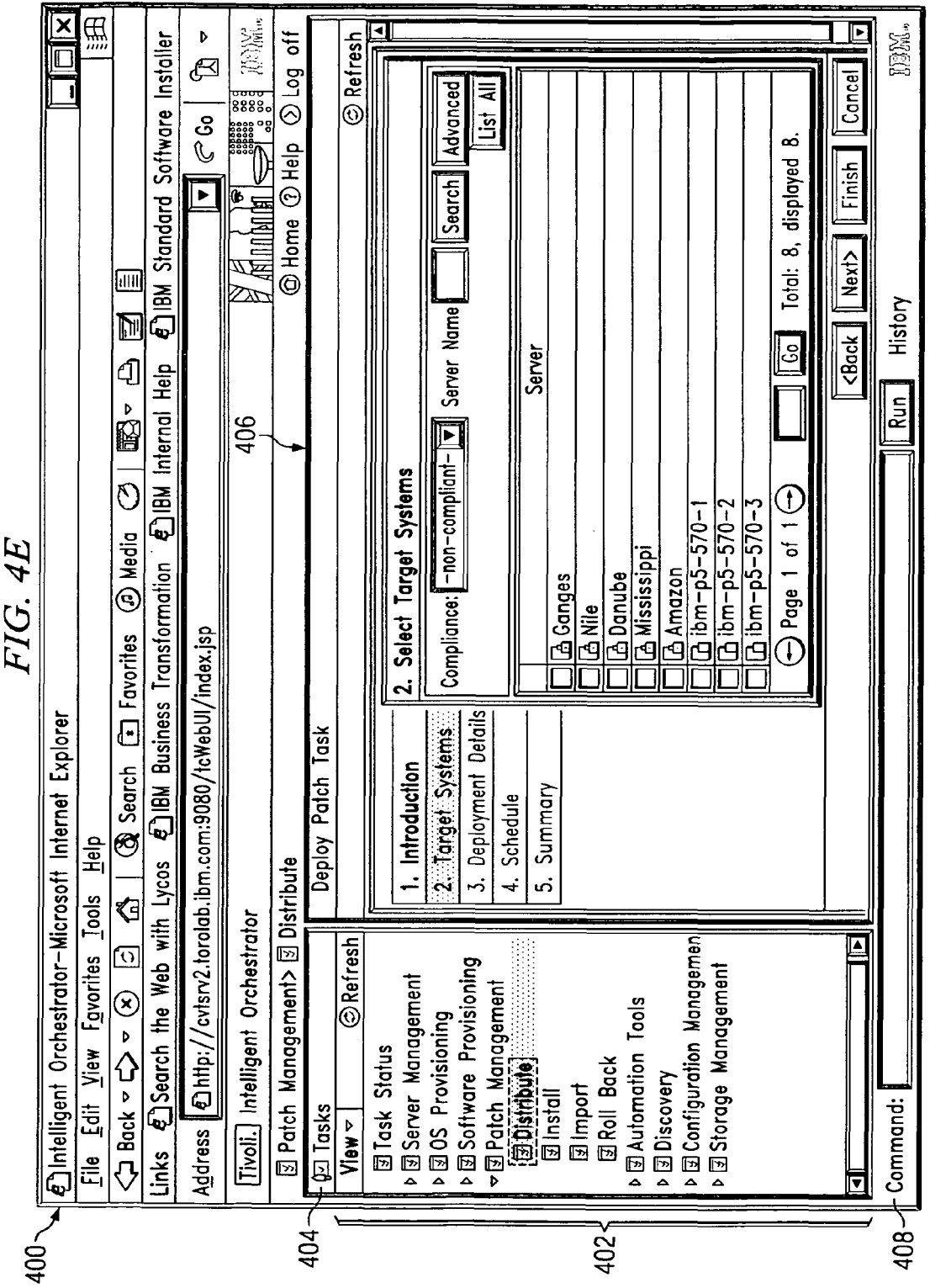
FIG. 4E is a diagram of a graphical user interface for presenting a user with options for obtaining distribution criteria in accordance with an illustrative embodiment of the present invention.

FIG. 4E is a diagram of a graphical user interface for presenting a user with options for obtaining distribution criteria in accordance with an illustrative embodiment of the present invention. Exemplary distribution options shown in second pane 406 may further allow a user to input the target systems for distribution using a field that indicates a specified target has been selected with an "X", search target system, and find which devices are compliant or non-compliant with the software change. For example, a user may be in charge of software distribution to thirty different computing devices. As a result, the user may select which of those thirty devices need a selected upgrade. Target systems may be target clients such as target clients 306, 308, and 310 of FIG. 3.

Figure 4F:
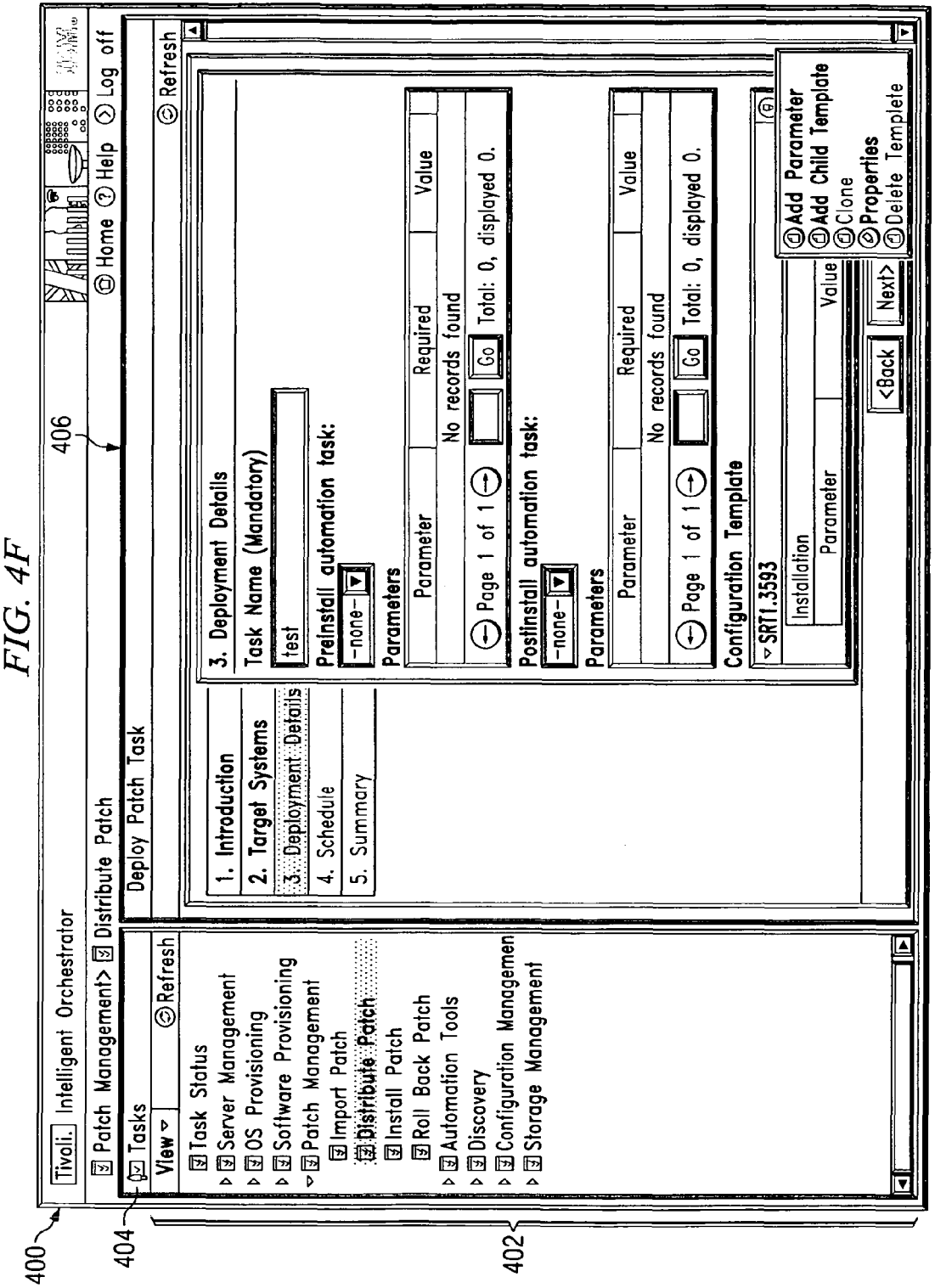
FIG. 4F is a diagram of a graphical user interface for presenting a user with options for obtaining distribution criteria in accordance with an illustrative embodiment of the present invention.

FIG. 4F is a diagram of a graphical user interface for presenting a user with options for obtaining distribution criteria in accordance with an illustrative embodiment of the present invention.

Figure 4G:
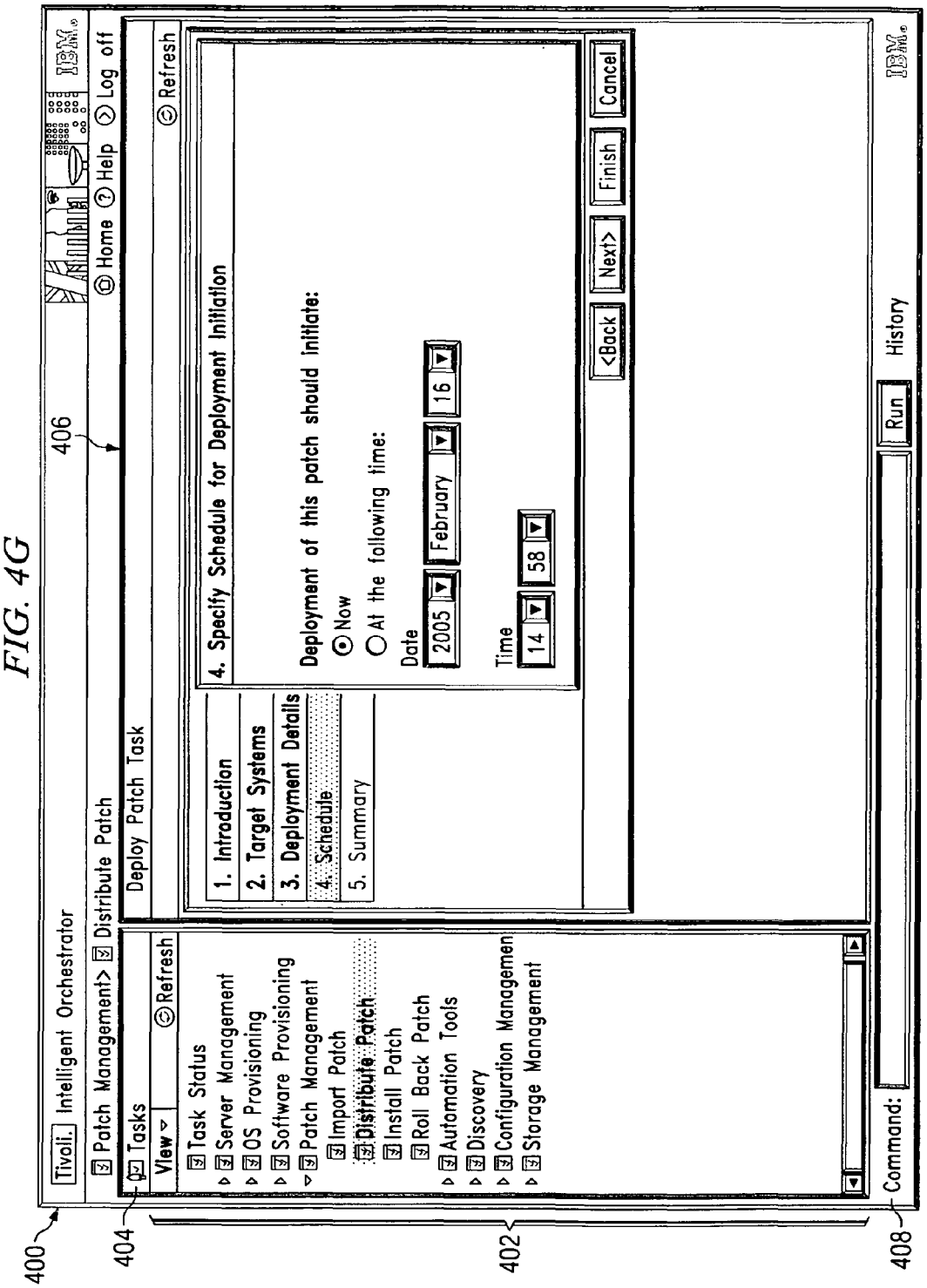
FIG. 4G is a diagram of a graphical user interface for presenting a user with options for obtaining distribution criteria in accordance with an illustrative embodiment of the present invention.

FIG. 4G is a diagram of a graphical user interface for presenting a user with options for obtaining distribution criteria in accordance with an illustrative embodiment of the present invention. Second pane 406 shows deployment schedule 410. The user uses deployment schedule 410 to indicate whether the software should be deployed immediately or at a specified time. For example, a user could specify a weekend morning as the time for distribution in order to ensure that the distribution occurs over the weekend and that other users are not inconvenienced by the distribution. In an alternative option, the user may elect to distribute the software immediately.

Figure 4H:
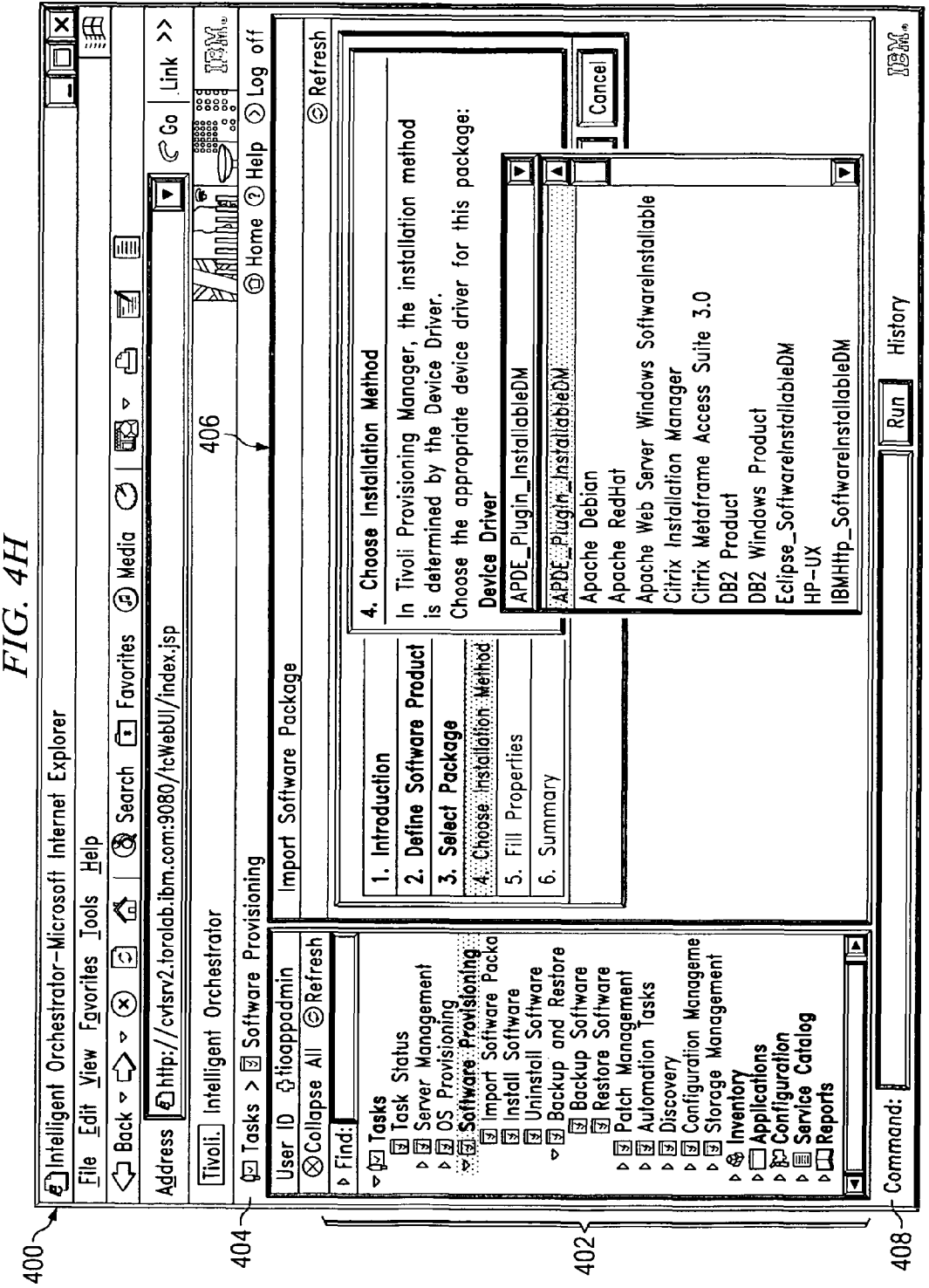
FIG. 4H is a diagram of a graphical user interface for presenting a user with information for obtaining installation criteria in accordance with an illustrative embodiment of the present invention.

FIG. 4H is a diagram of a graphical user interface for presenting a user with information for obtaining installation criteria in accordance with an illustrative embodiment of the present invention. First pane 402 shows that the user is in the installation panels. Second pane 406 of window 400 shows information that may be presented to a user in order to subsequently obtain installation criteria such as installation criteria 334 of FIG. 3. Exemplary installation information may include requesting the user know the name of software tasks to be carried out, an order for those tasks, and a time for installation.

Figure 4I:
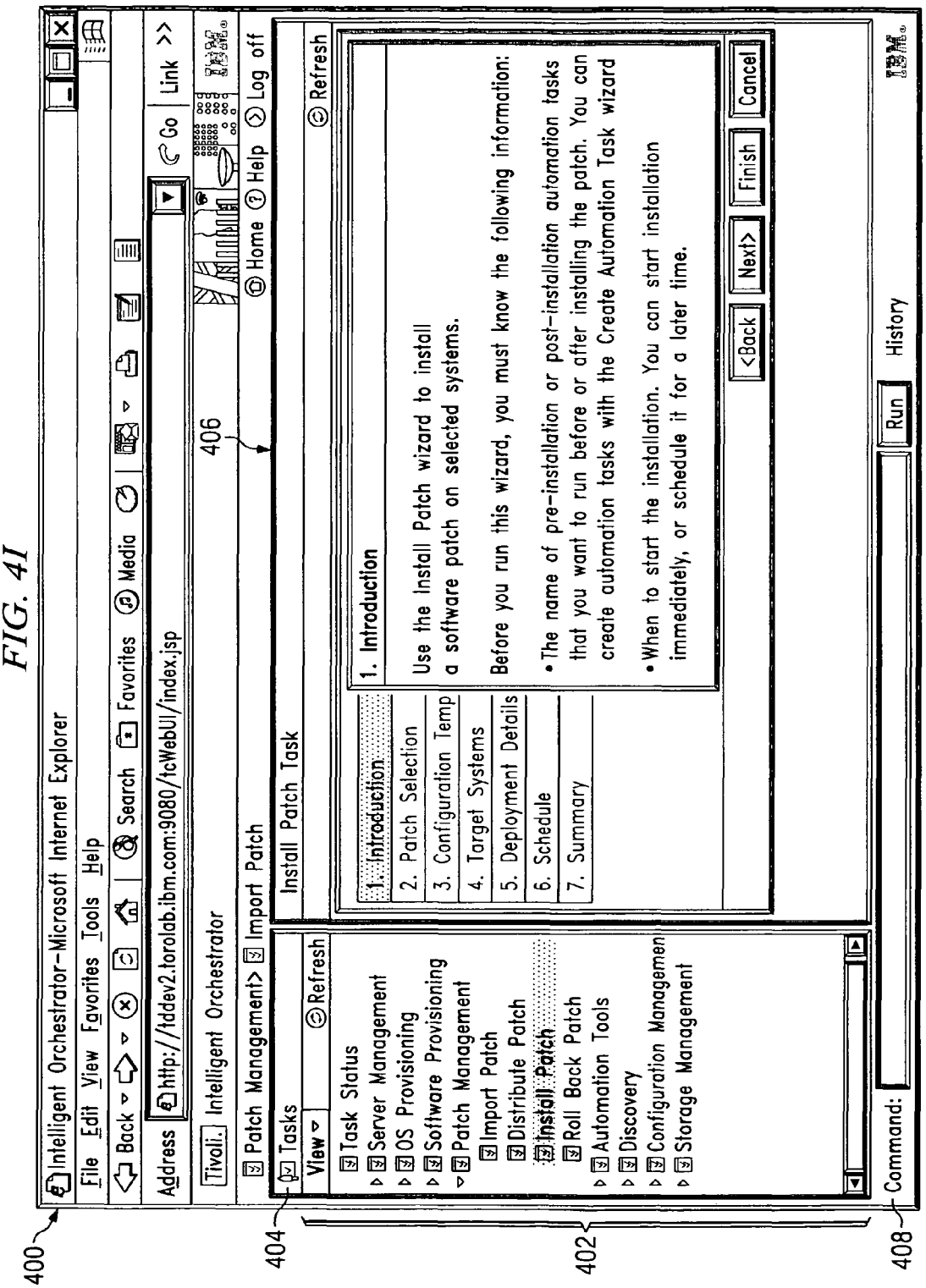
FIG. 4I is a diagram of a graphical user interface for presenting a user with options for obtaining installation criteria in accordance with an illustrative embodiment of the present invention.

FIG. 4I is a diagram of a graphical user interface for presenting a user with options for obtaining installation criteria in accordance with an illustrative embodiment of the present invention. First pane 402 shows that the user is in the installation panels such as installation panels 324 of FIG. 3. Second pane 406 of window 400 shows options that may be presented to a user in order to obtain installation criteria such as installation criteria 334 of FIG. 3. Exemplary displayed installation options may allow a user to specify an appropriate device driver for a software package so that the installation occurs properly. For example, the appropriate installation may require a specific operating system or interface be used for installation.

Figure 4J:
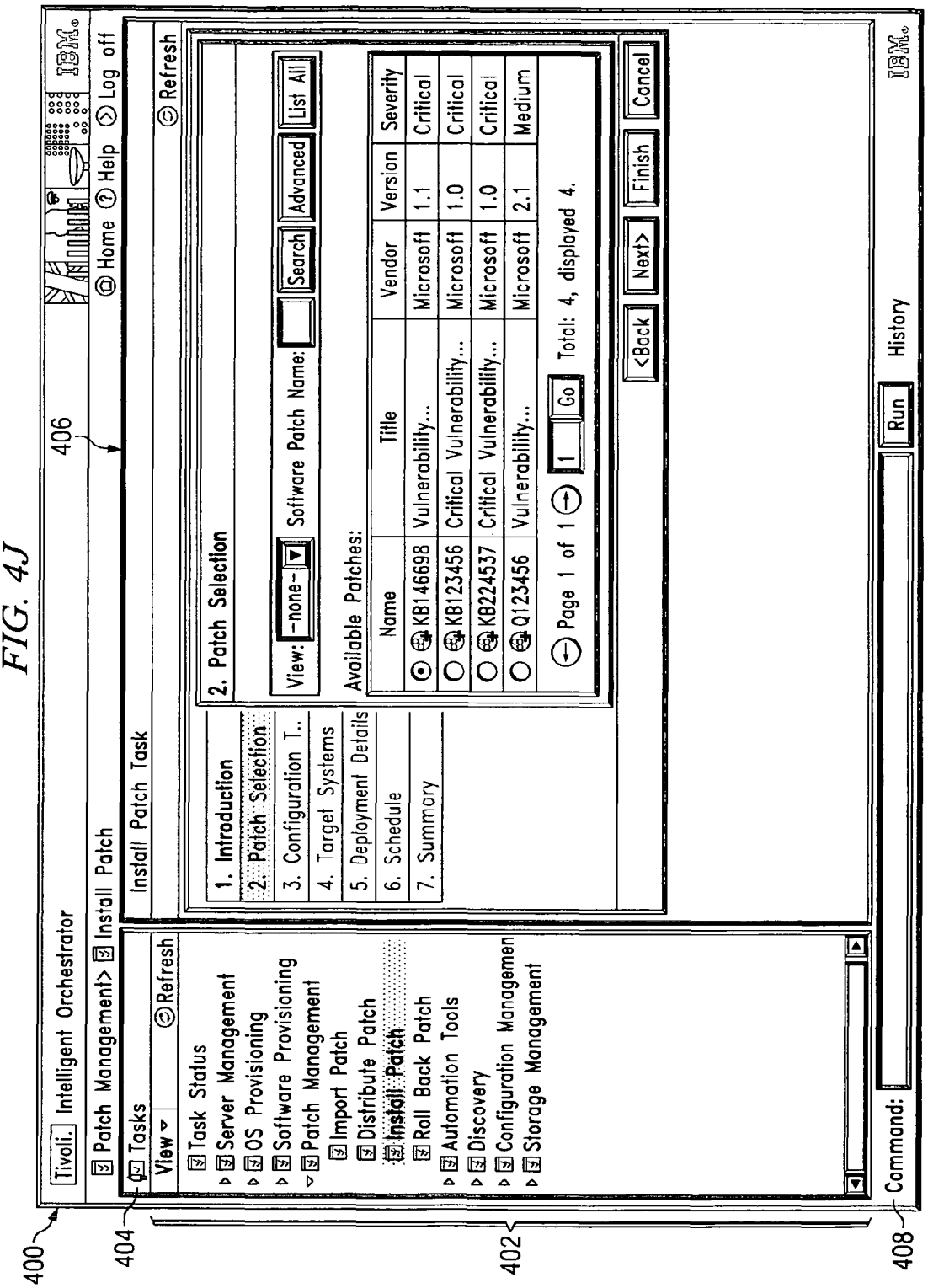
FIG. 4J is a diagram of a graphical user interface for presenting a user with options for obtaining installation criteria in accordance with an illustrative embodiment of the present invention.

FIG. 4J is a diagram of a graphical user interface for presenting a user with options for obtaining installation criteria in accordance with an illustrative embodiment of the present invention. Second pane 406 of window 400 shows options that may be presented to a user in order to obtain installation criteria such as installation criteria 334 of FIG. 3. For example, exemplary installation options may allow a user to specify software for installation from a list of potential software installations, updates, or patches. A user may also be able to search through the patches and view information such as name, title, vendor, version, and severity.

Figure 4K:
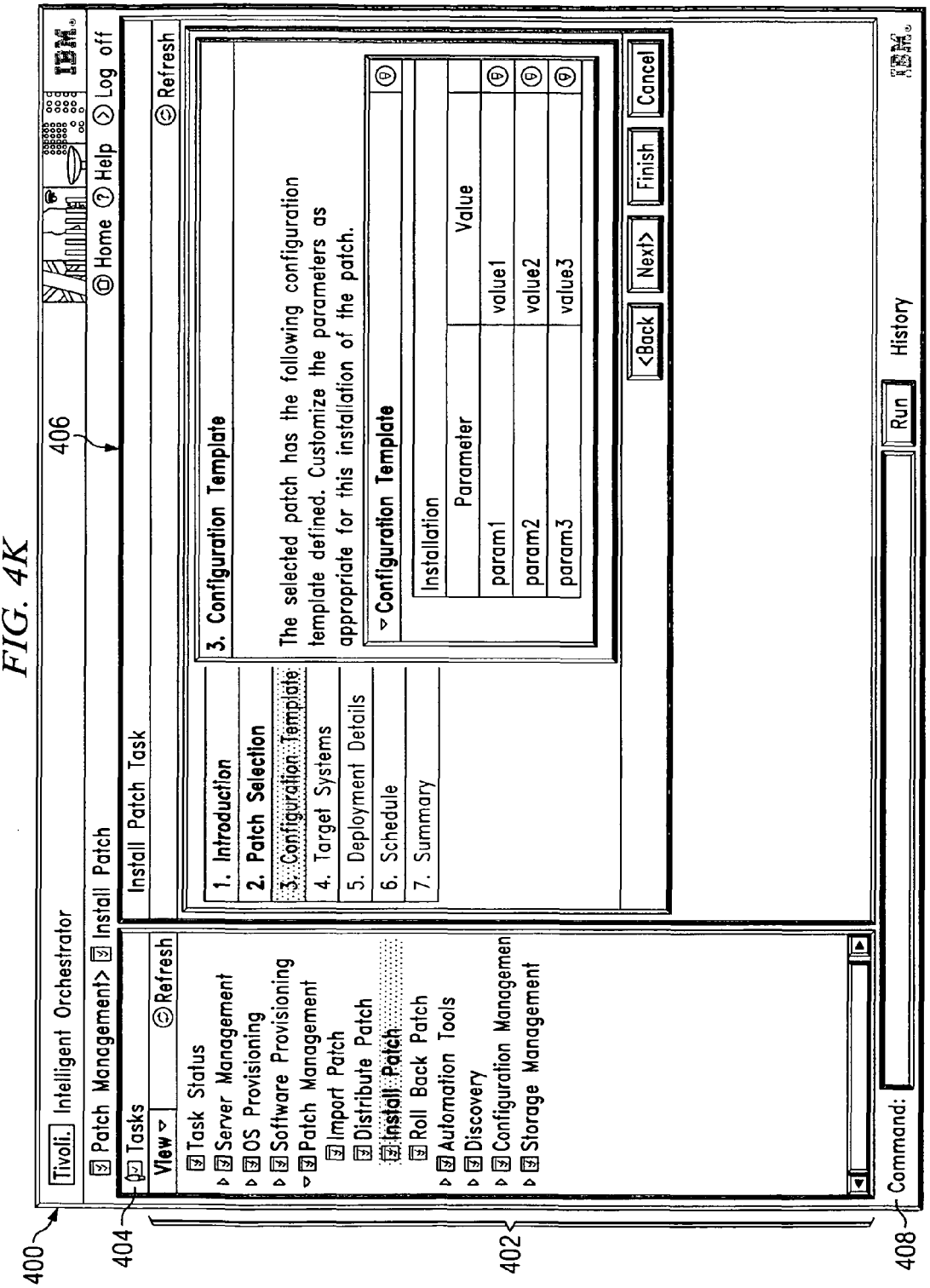
FIG. 4K is a diagram of a graphical user interface for presenting a user with options for obtaining installation criteria in accordance with an illustrative embodiment of the present invention.

FIG. 4K is a diagram of a graphical user interface for presenting a user with options for obtaining installation criteria in accordance with an illustrative embodiment of the present invention. Second pane 406 of window 400 also shows options that may be displayed to a user in order to obtain installation criteria. Exemplary installation options may allow a user to specify specific parameters and values for each parameter. Parameters represent installation/configuration options for the software being installed. Different pieces of software may require a different set of parameters when installed. Examples may include, installation directory, the port the software will listen on, and install as service option.

Figure 4L:
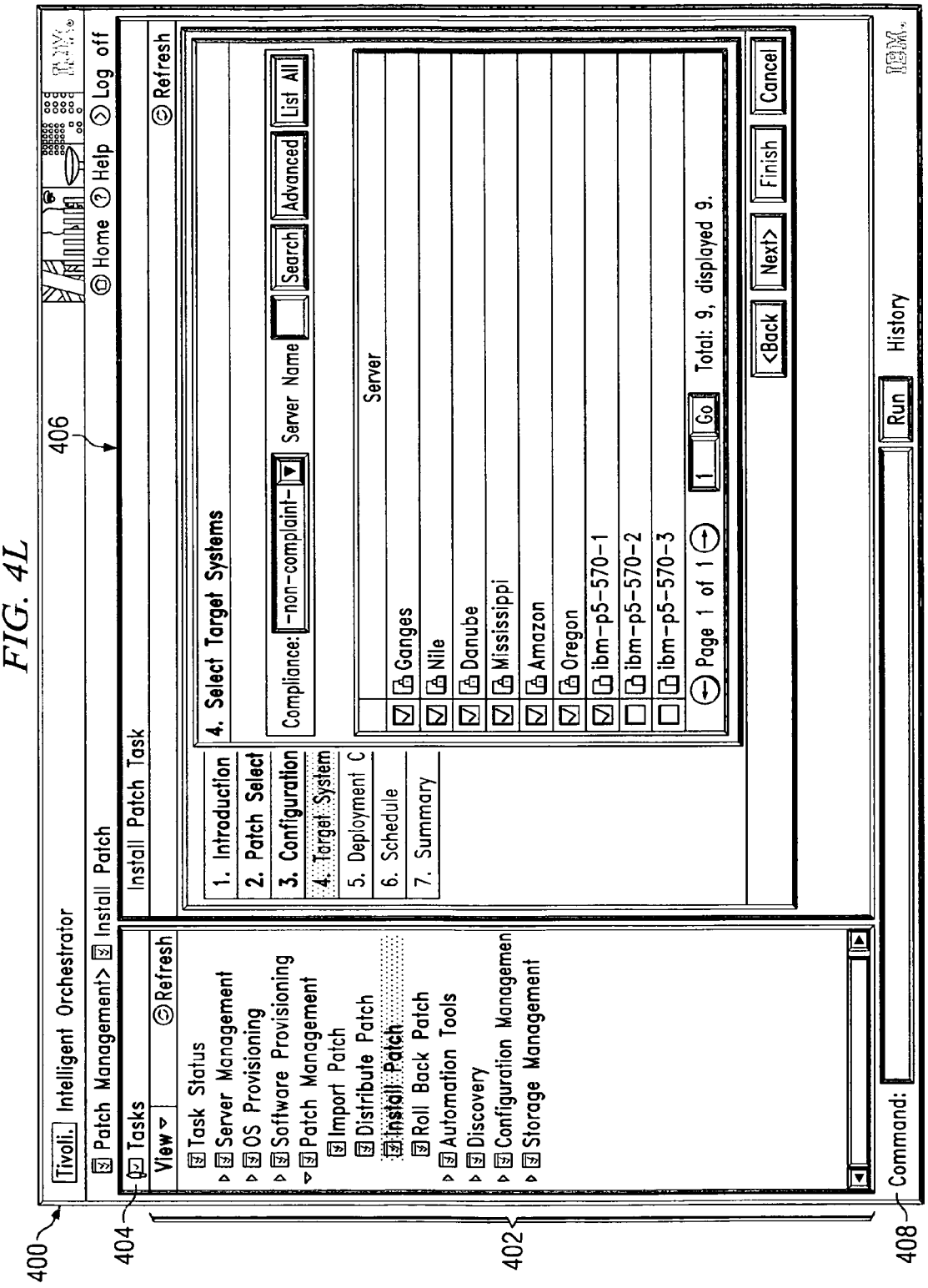
FIG. 4L is a diagram of a graphical user interface for presenting a user with options for obtaining installation criteria from a user in accordance with an illustrative embodiment of the present invention.

FIG. 4L is a diagram of a graphical user interface for presenting a user with options for obtaining installation criteria from a user in accordance with an illustrative embodiment of the present invention. Second pane 406 of window 400 also shows options that may be displayed to a user in order to obtain installation criteria. Exemplary installation criteria may include options that allow a user to input the target systems for installation. The target systems may be clients such as target clients 306, 308, and 310 of FIG. 3.

Figure 4M:
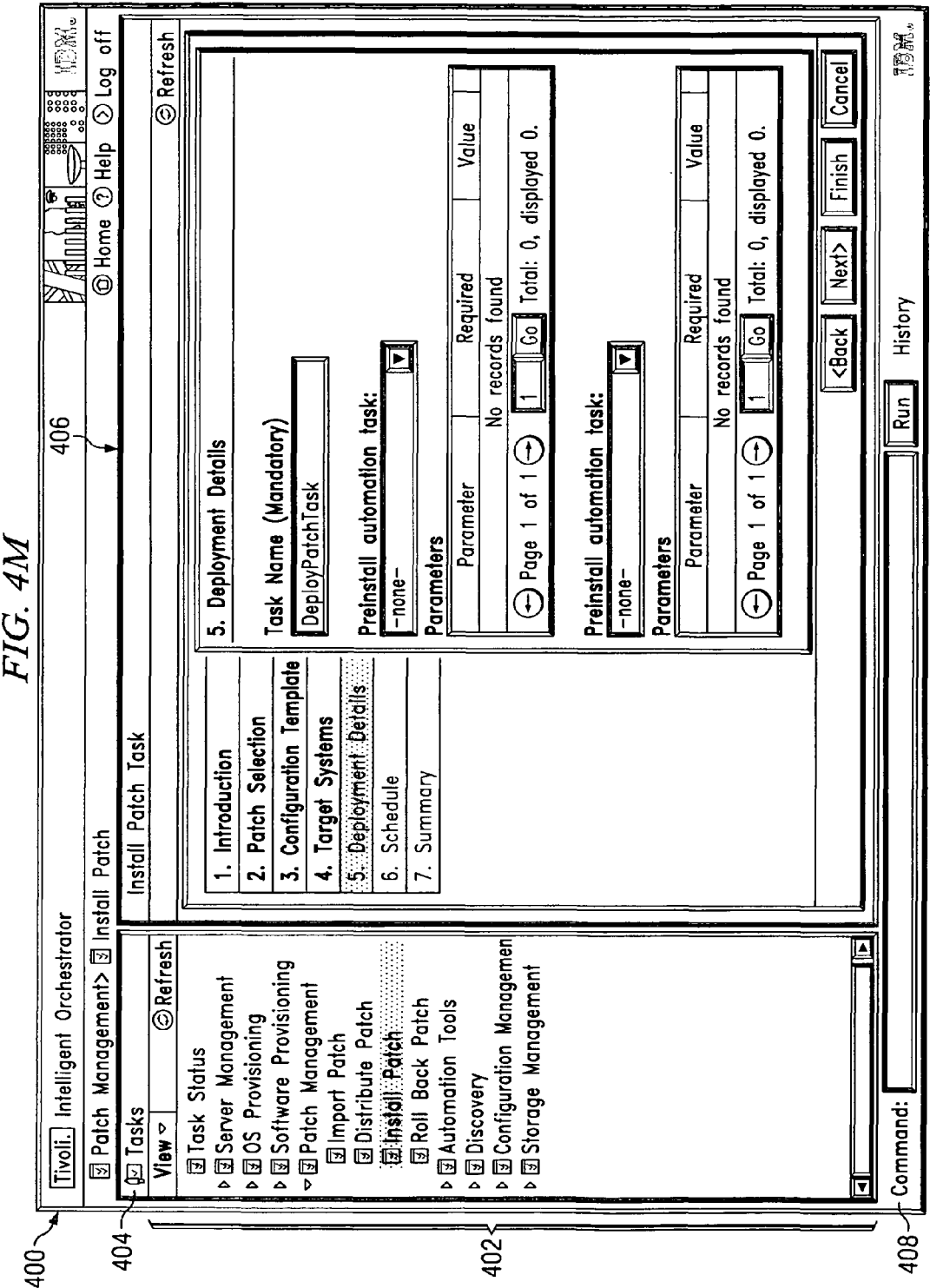
FIG. 4M is a diagram of a graphical user interface for presenting a user with options for obtaining installation criteria in accordance with an illustrative embodiment of the present invention.

FIG. 4M is a diagram of a graphical user interface for presenting a user with options for obtaining installation criteria in accordance with an illustrative embodiment of the present invention. Second pane 406 of window 400 also shows options that may be displayed to a user in order to obtain installation criteria. Exemplary installation criteria may also include options that allow a user to input the task name as well as selecting pre-install and post-install automation tasks with associated parameters. The pre and post install automation tasks may be selected from a list of predefined automation tasks within the software management system. The automation task may be scripts or workflows that provide some generic functionality that may be reused in different instances. Example of possible automation tasks may include a script that reboots the system after the software installation has been performed or a script/workflow that verifies that there is no software waiting for a reboot on the target system before proceeding with the installation, or a workflow that stops applicable antivirus software that may interfere with the installation process before proceeding.

Figure 4N:
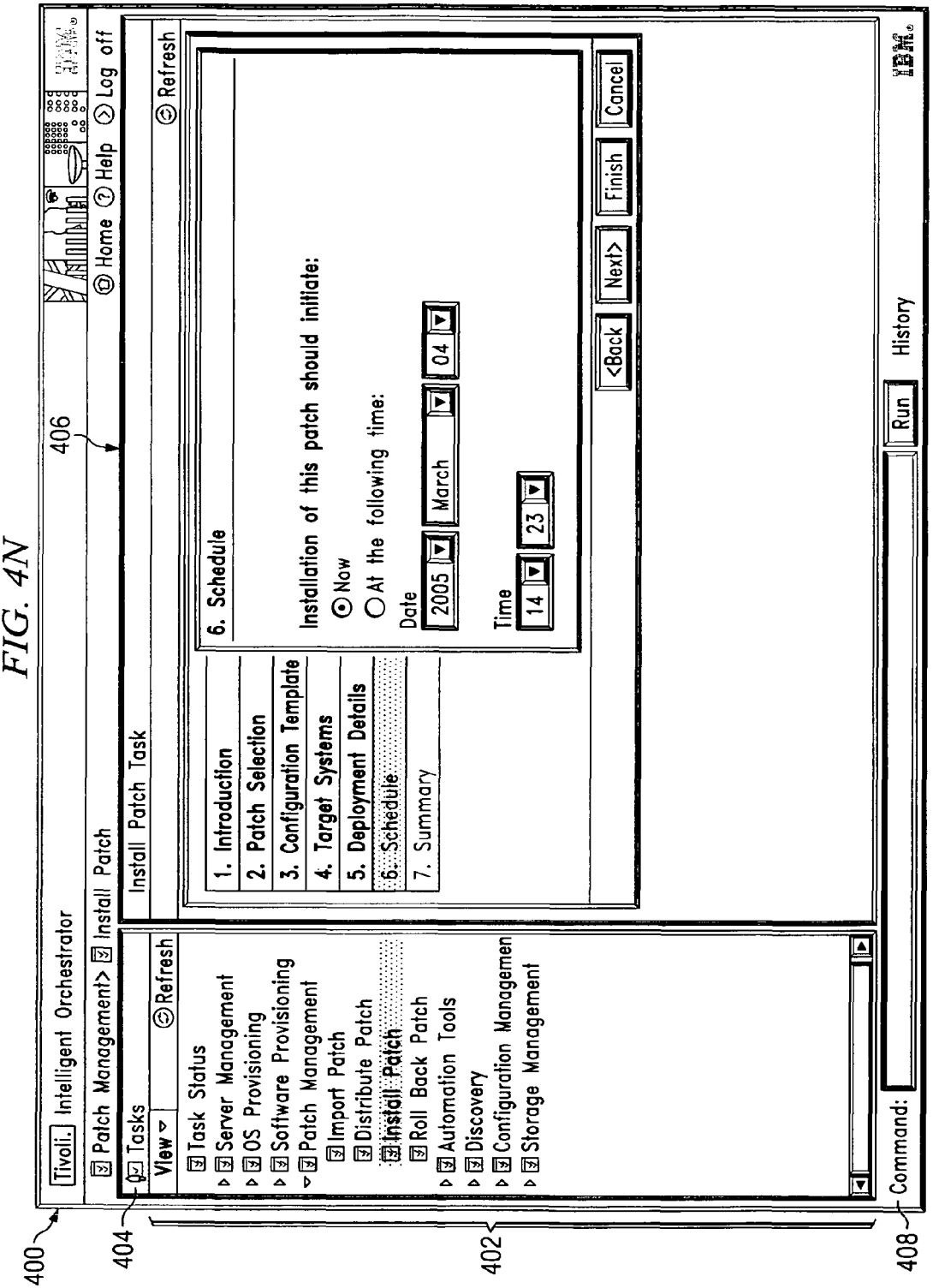
FIG. 4N is a diagram of a graphical user interface for presenting a user with options obtaining installation criteria in accordance with an illustrative embodiment of the present invention.
Figure 40:
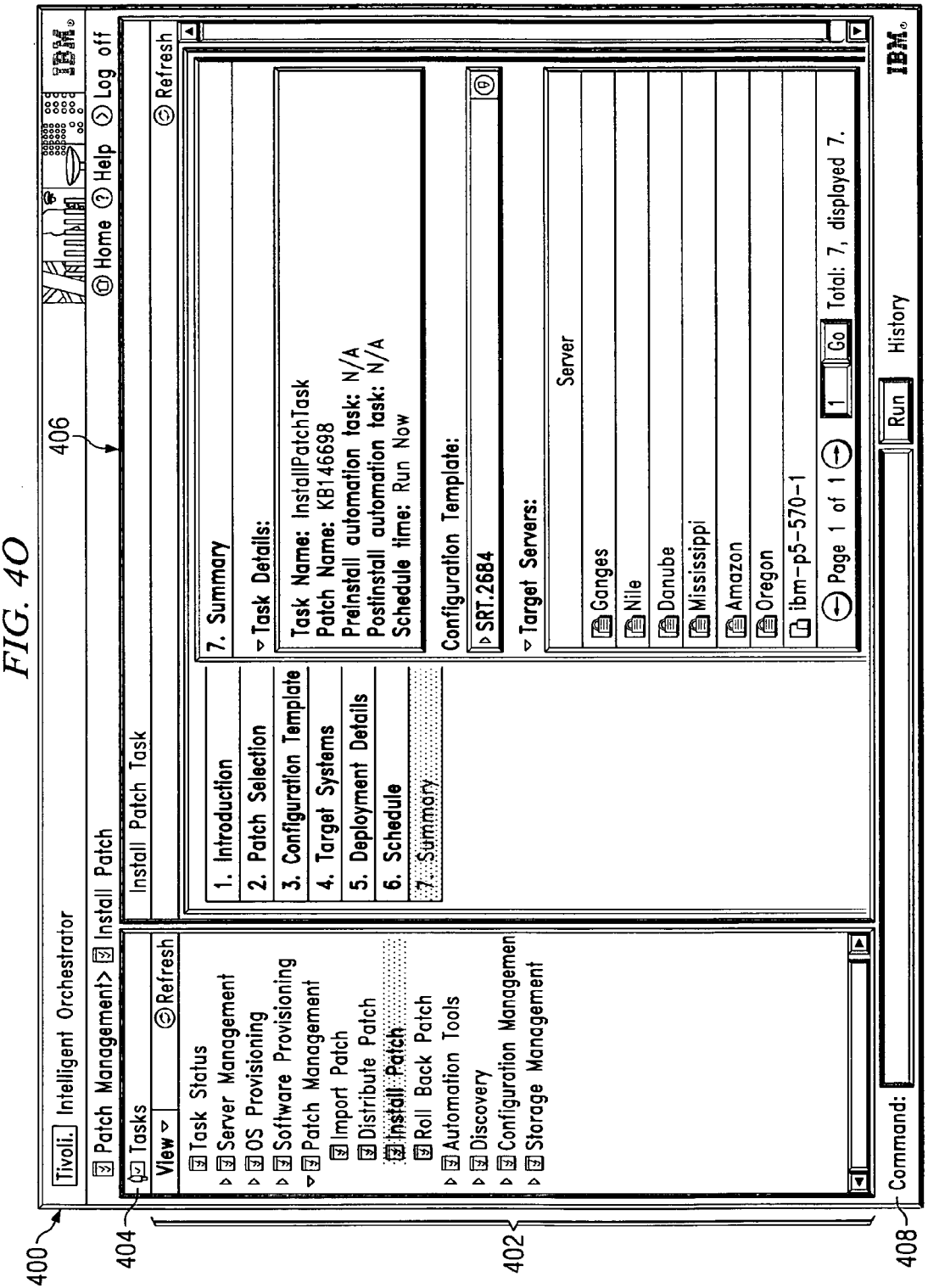

FIG. 4N is a diagram of a graphical user interface for presenting a user with options obtaining installation criteria in accordance with an illustrative embodiment of the present invention. Second pane 406 of window 400 also shows options that may be displayed to a user in order to obtain installation criteria. Exemplary installation options may allow a user to specify a schedule for deployment initiation including instructions for immediate installation or installation at a planned time. These installation options may be integrated in an installation script, such as installation package 328 of FIG. 3 that is sent and executed by the target client, such as target clients 306, 308, and 310 of FIG. 3.

FIG. 4O is a diagram of a graphical user interface for presenting a user with information regarding software installation in accordance with an illustrative embodiment of the present invention. Second pane 406 of window 400 shows information or a summary of installation criteria such as installation criteria 334 of FIG. 3 that may be displayed to a user prior to immediate installation. Exemplary installation summary information may include the target servers, task name, patch name, and scheduled time as well as pre-install and post-install tasks.

Figure 4P:
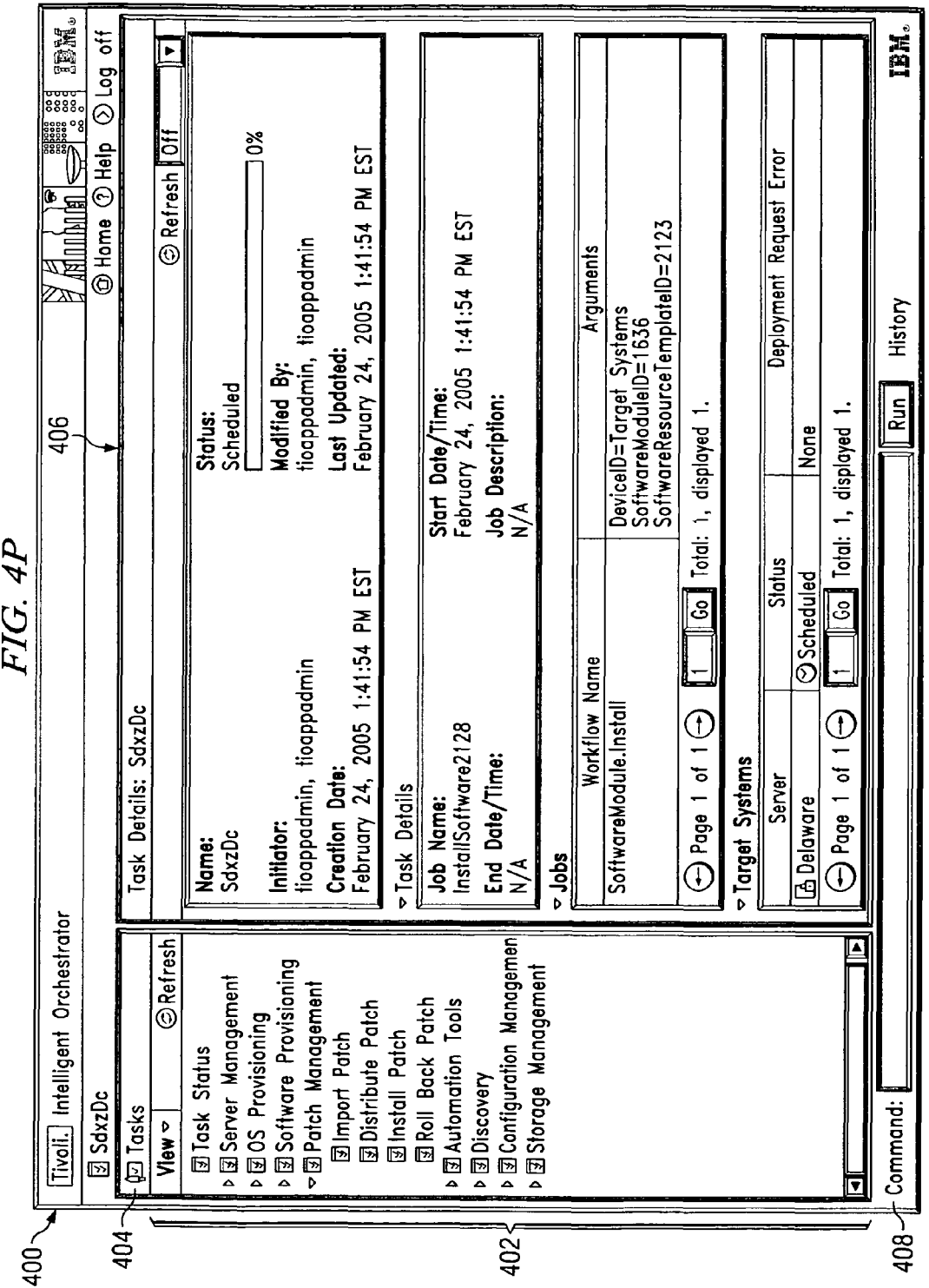
FIG. 4P is a diagram of a graphical user interface for presenting a user with information regarding software installation in accordance with an illustrative embodiment of the present invention.

FIG. 4P is a diagram of a graphical user interface for presenting a user with information regarding software installation in accordance with an illustrative embodiment of the present invention. First pane 402 shows that the user is in viewing task status and details in an installation panel such as installation panels 324 of FIG. 3. Second pane 406 of window 400 shows task details such as the progress, status, or failure of the execution of an installation package such as installation package 328 of FIG. 3. The user may use second pane 406 to find details regarding a completed or running task.

Figure 4Q:
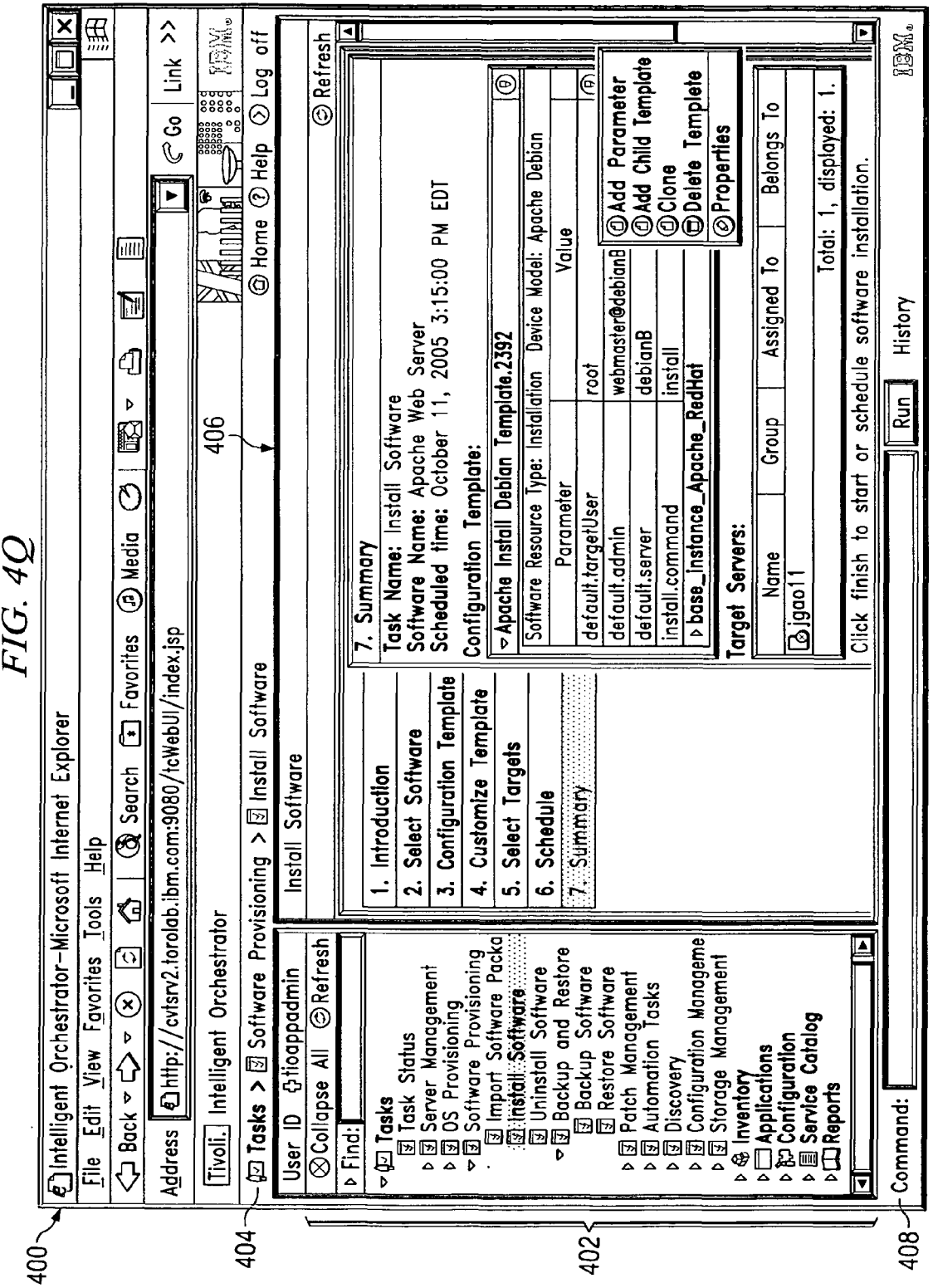
FIG. 4Q is a diagram of a graphical user interface for presenting a user with summary information regarding software installation in accordance with an illustrative embodiment of the present invention.

FIG. 4Q is a diagram of a graphical user interface for presenting a user with summary information regarding software installation in accordance with an illustrative embodiment of the present invention.

Second pane 406 of window 400 shows information or a summary of installation criteria such as installation criteria 334 of FIG. 3 that may be displayed to a user prior to a time scheduled installation. Exemplary installation summary information may also include the task name, software name, scheduled time, configuration template including parameters and values, and target servers.

Exemplary task information may include the target name, scheduled time, software installation initiator, task modifications, task creation date and updates, installation status or progress, and other task details. The summary may also list workflow names as well as arguments describing the job, which may include device identification, software module identification, and software resource template identification. Target system information may also be displayed in the summary.

Figure 5A:
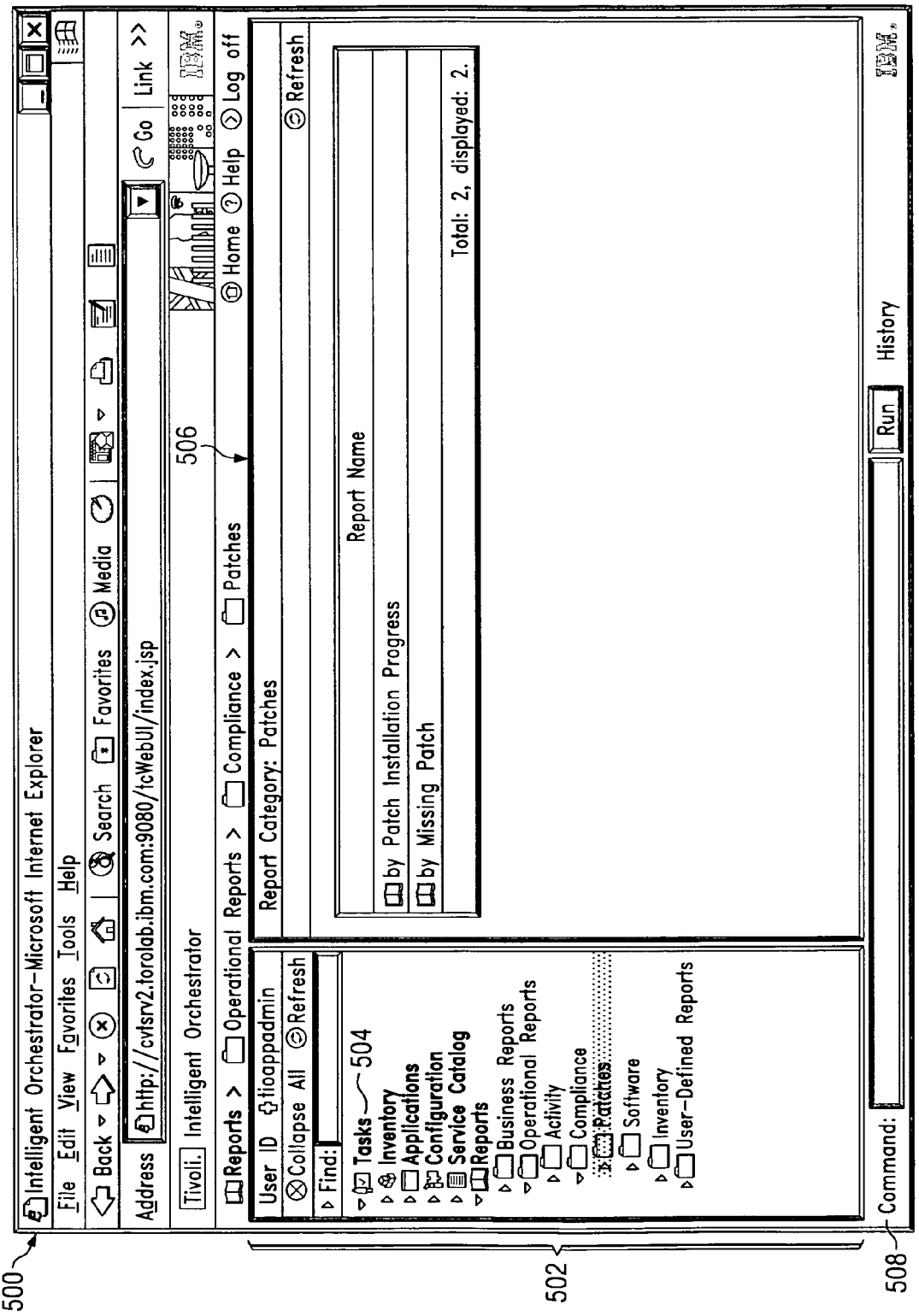
FIG. 5A is a diagram of a graphical user interface for presenting a user with compliance verification status information in accordance with an illustrative embodiment of the present invention.

FIG. 5A is a diagram of a graphical user interface for presenting a user with compliance verification status information in accordance with an illustrative embodiment of the present invention. Window 500 illustrates an interface that is presented to a user for displaying information and receiving user input as to what action is to be taken. Window 500 may be displayed to a user on a graphical user interface, such as graphical user interface 318 of FIG. 3 in order to receive user input and present information to the user in a software management program, such as software management application 312 of FIG. 3.

Window 500 contains first pane 502 which includes task index 504, an expandable drop down list that allows a user to select different tasks to perform in the software management application. Task index 504 highlights the action being performed and dynamically changes within first pane 502 based on the action being performed. In this example, the user has selected reports and more specifically patches from task index 504. The user input results in second pane 506 being displayed in window 500. In this example, first pane 502 is displayed on the left portion, and second pane 506 is displayed on the right portion of window 500.

Based on the selected task second pane 506 displays information and options to the user in order to verify compliance status. Second pane 506 also allows a user to search for tasks by entering a keyword. Window 500 includes command entry line 508 so that the user can enter and initiate a task as needed. The user may initiate a task by entering a command in command entry line 508 associated with a specific task.

The information or options presented to the user in first pane 502 and second pane 506 are not fixed but rather are progressive in response to input received from the user. In some cases, different steps or options may not need to be presented to a user based on previous input. For example, as the user runs report and verification information, the selected criteria may only need to be entered once. In window 500, second pane 506 may display a list of compliance reports that are available for software patches.

Figure 5B:
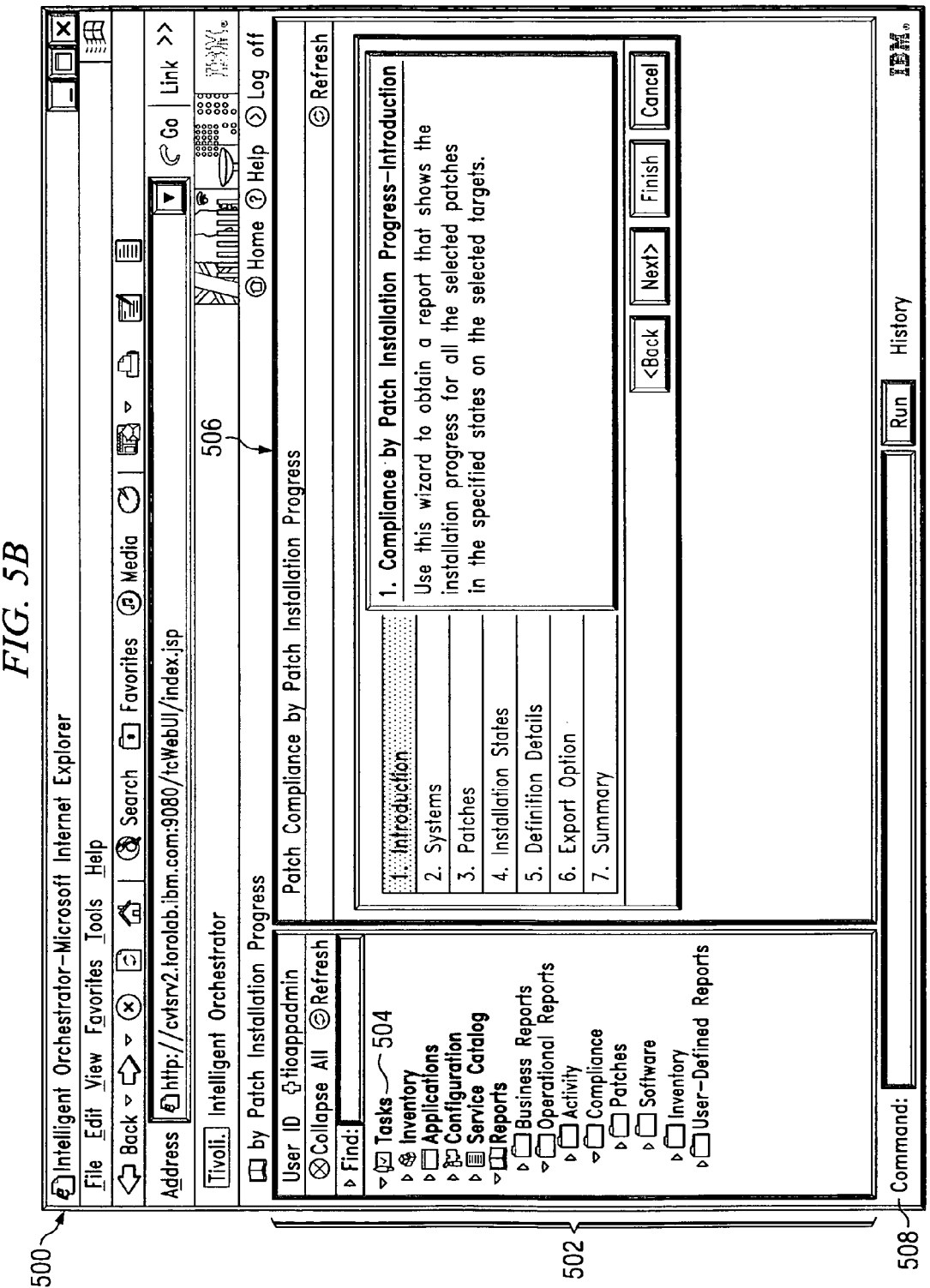
FIG. 5B is a diagram of a graphical user interface for presenting a user with compliance verification status information in accordance with an illustrative embodiment of the present invention.

FIG. 5B is a diagram of a graphical user interface for presenting a user with compliance verification status information in accordance with an illustrative embodiment of the present invention. Second pane 506 displays a window indicating that the user may need to specify a target, target state, and selected target for verification in order to fully verify compliance status in future windows.

Figure 5C:
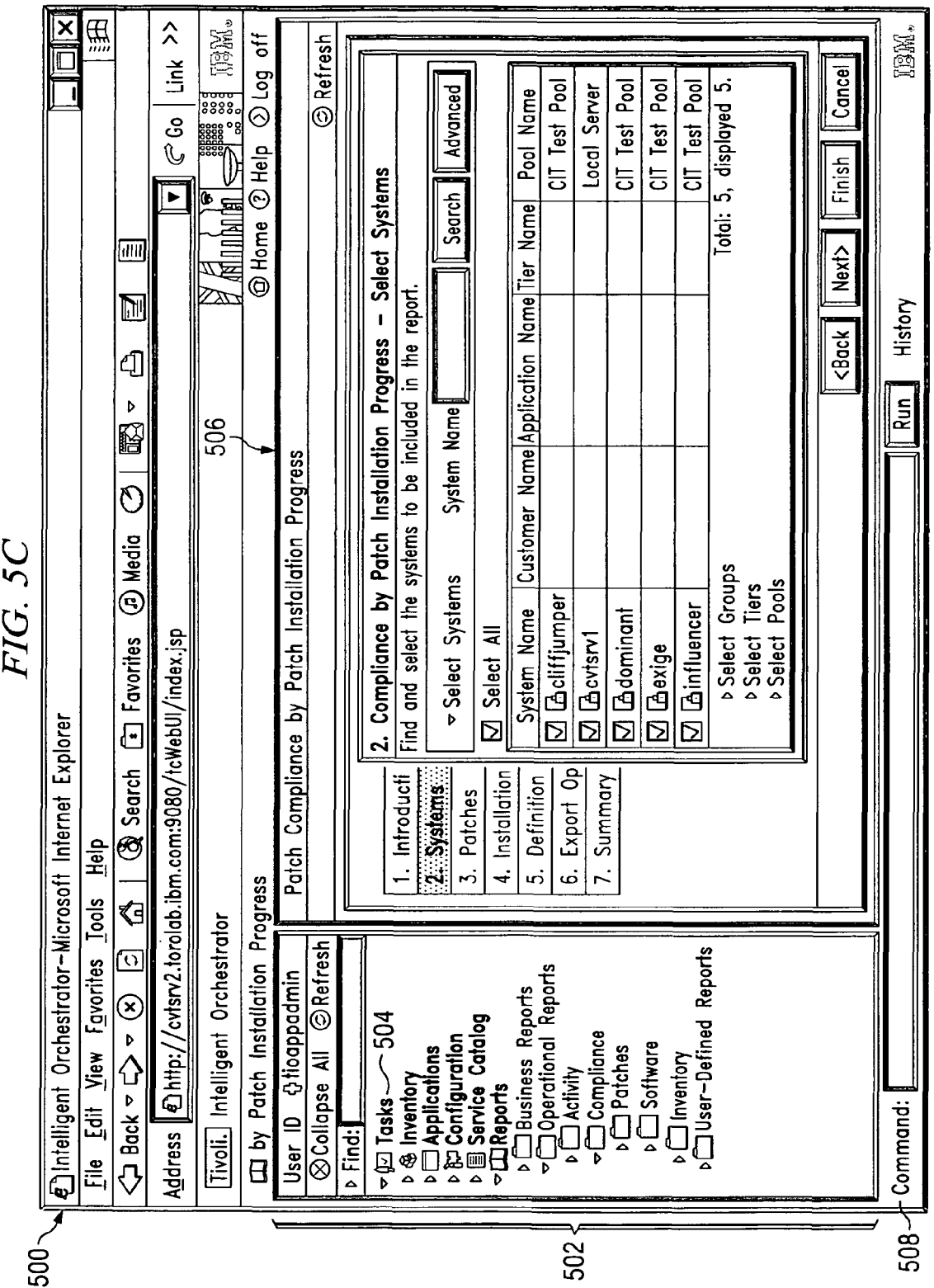
FIG. 5C is a diagram of a graphical user interface for presenting a user with compliance verification status options in accordance with an illustrative embodiment of the present invention.

FIG. 5C is a diagram of a graphical user interface for presenting a user with compliance verification status options in accordance with an illustrative embodiment of the present invention. Second pane 506 of window 500 may allow a user to select a target system to be included in a report. The report may detail information regarding software management with respect to each target system. A user may also search for a specified system. The user may also select from groups, tiers, and pools of target systems for reporting purposes. Target systems may be selected individually or collectively for efficient software reporting.

Figure 5D:
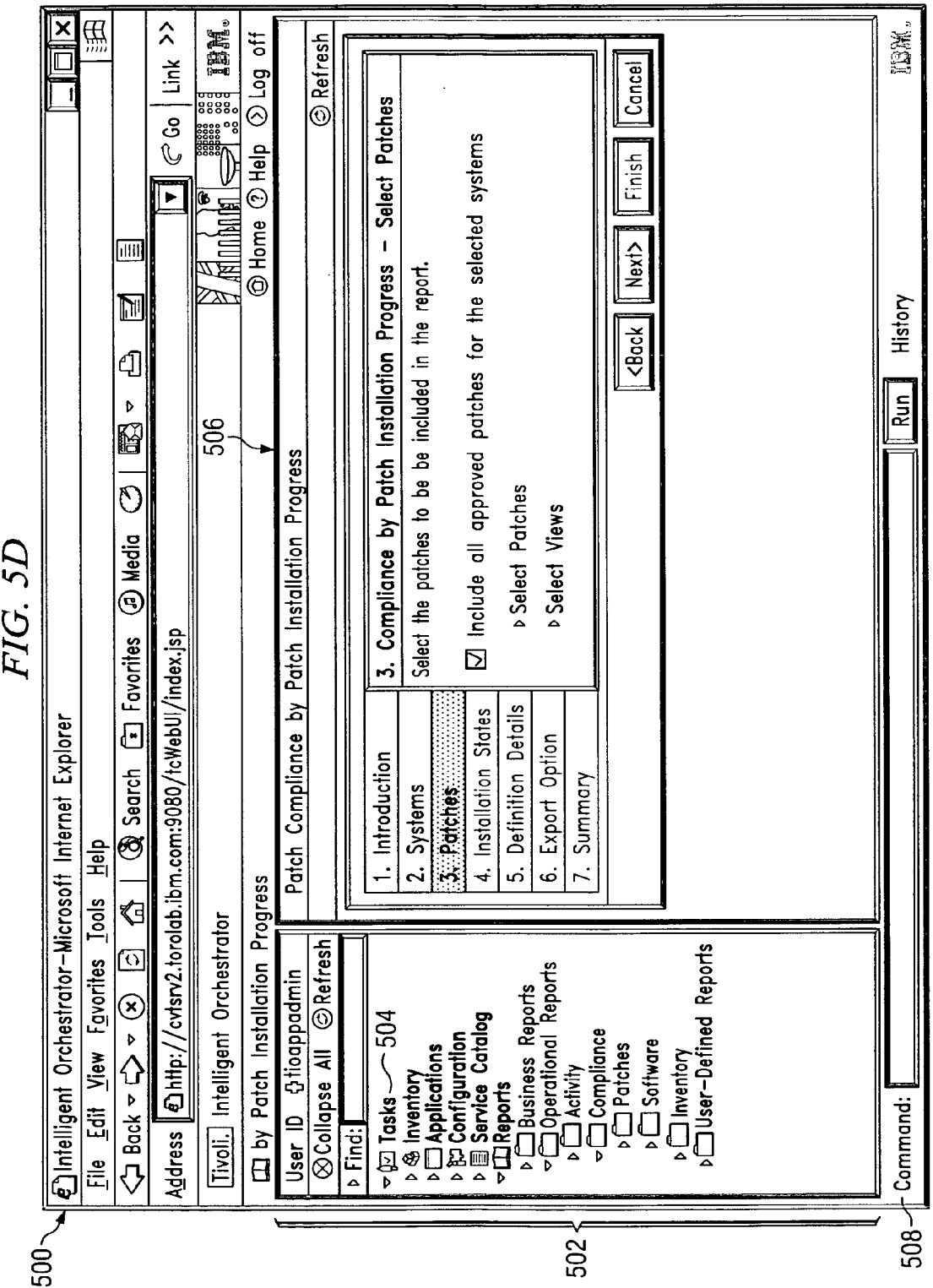
FIG. 5D is a diagram of a graphical user interface for presenting a user with compliance verification status options in accordance with an illustrative embodiment of the present invention.

FIG. 5D is a diagram of a graphical user interface for presenting a user with compliance verification status options in accordance with an illustrative embodiment of the present invention. Second pane 506 of window 500 may allow a user to select the software patches a compliance query will check for. For example, the user may select to view all approved patches for the selected systems in the report. Alternatively, the user may specify select patches to view in the compiled report.

Figure 5E:
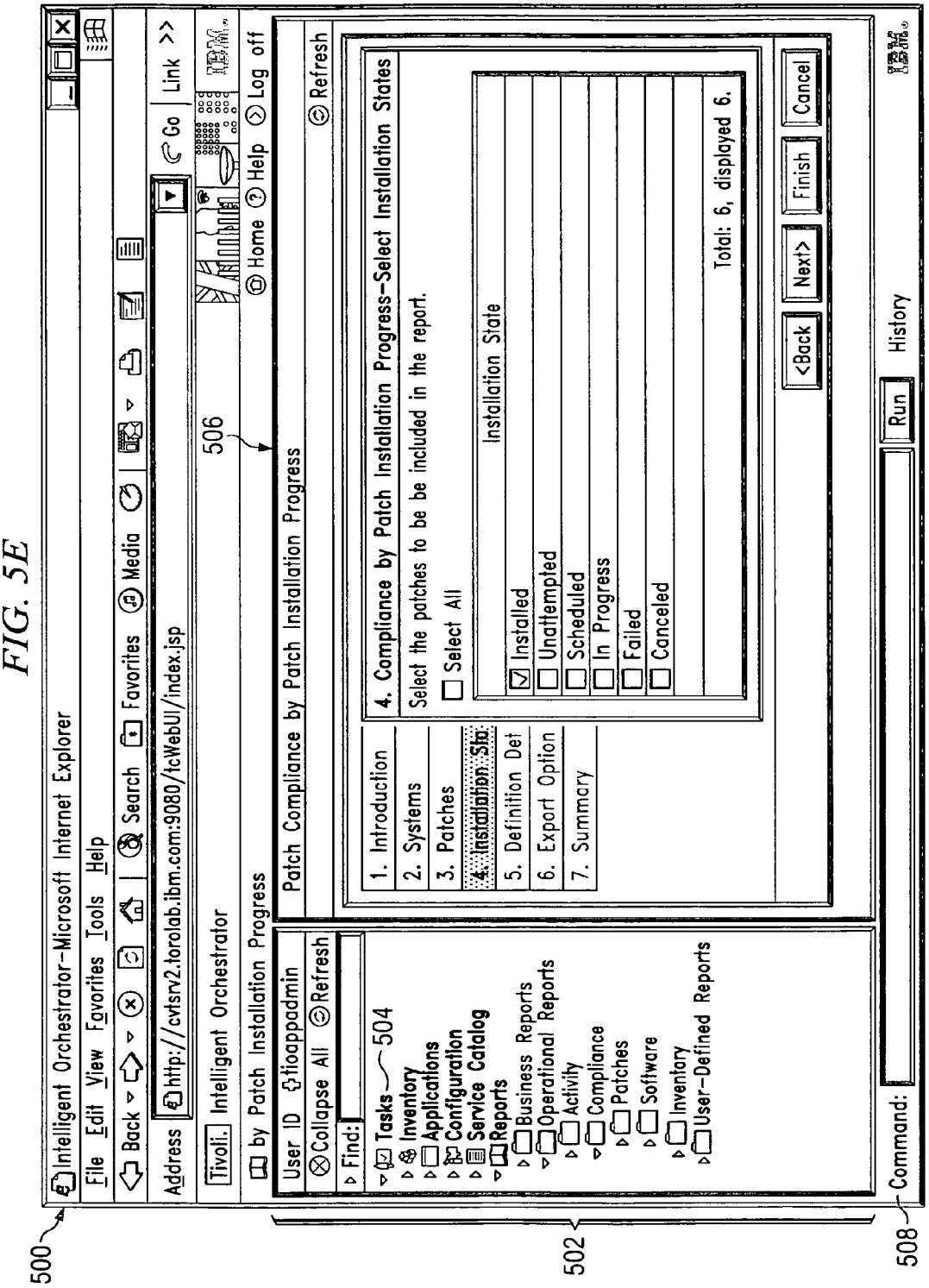
FIG. 5E is a diagram of a graphical user interface for presenting a user with compliance verification status options in accordance with an illustrative embodiment of the present invention.

FIG. 5E is a diagram of a graphical user interface for presenting a user with compliance verification status options in accordance with an illustrative embodiment of the present invention. Second pane 506 of window 500 may allow a user to specify what kinds of compliance status should be included in the report. For example, the user may select to include all possible software states in the report. Alternatively, the user may select individual states which may include, installed, unattempted, scheduled, in progress, failed or cancelled.

Figure 5F:
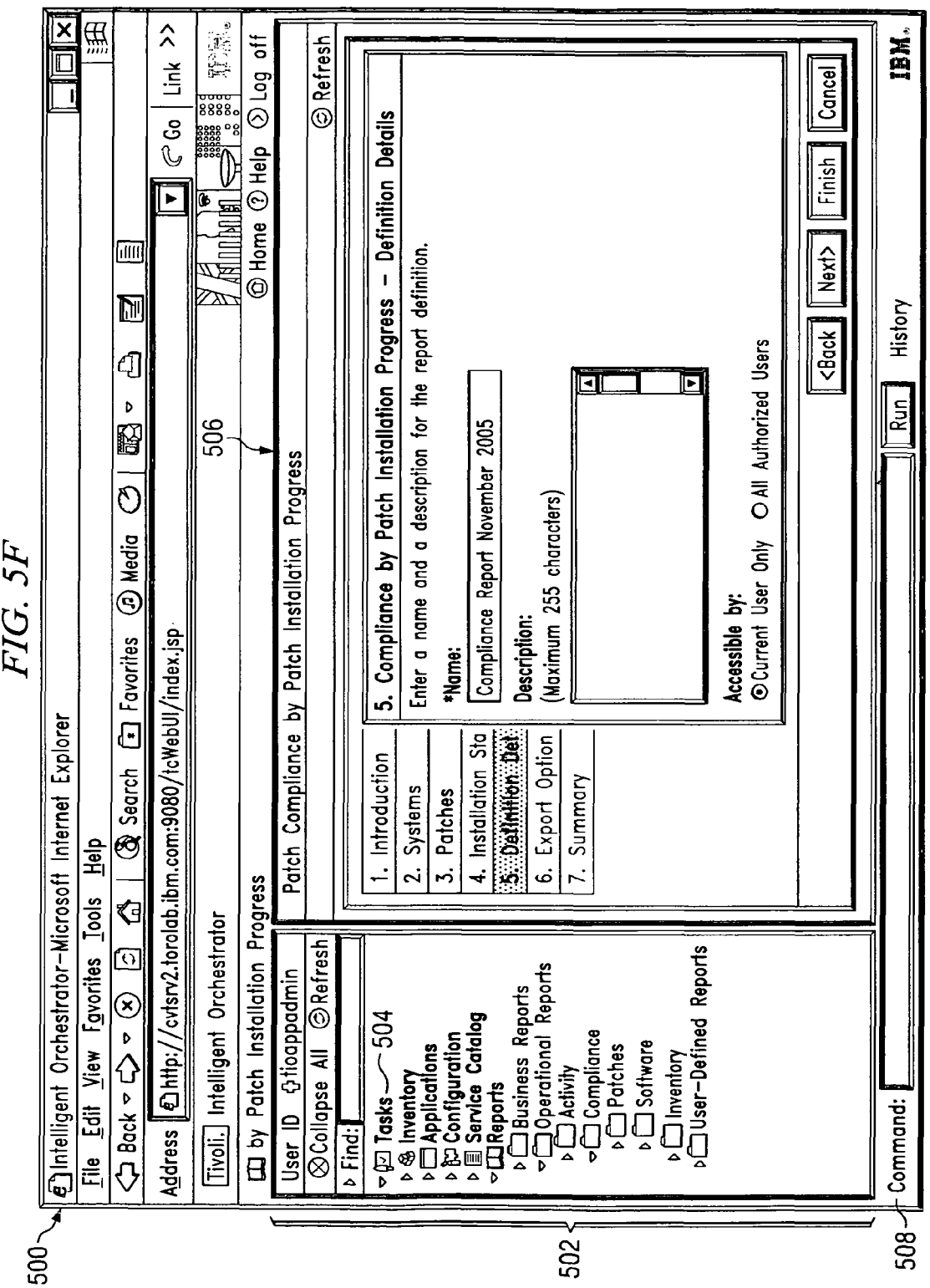
FIG. 5F is a diagram of a graphical user interface for presenting a user with compliance verification status options in accordance with an illustrative embodiment of the present invention.

FIG. 5F is a diagram of a graphical user interface for presenting a user with compliance verification status options in accordance with an illustrative embodiment of the present invention.

Second pane 506 of window 500 may allow a user to name and describe the compliance query previously defined. Additionally, the user may determine the access level of the end report. The name and description may allow the report to be more easily identified and may follow user specified naming and description formats and guidelines. For example, the user may indicate that the report is only for the requesting user or for all applicable users. In another example, the report may be sent to specified users.

Figure 5G:
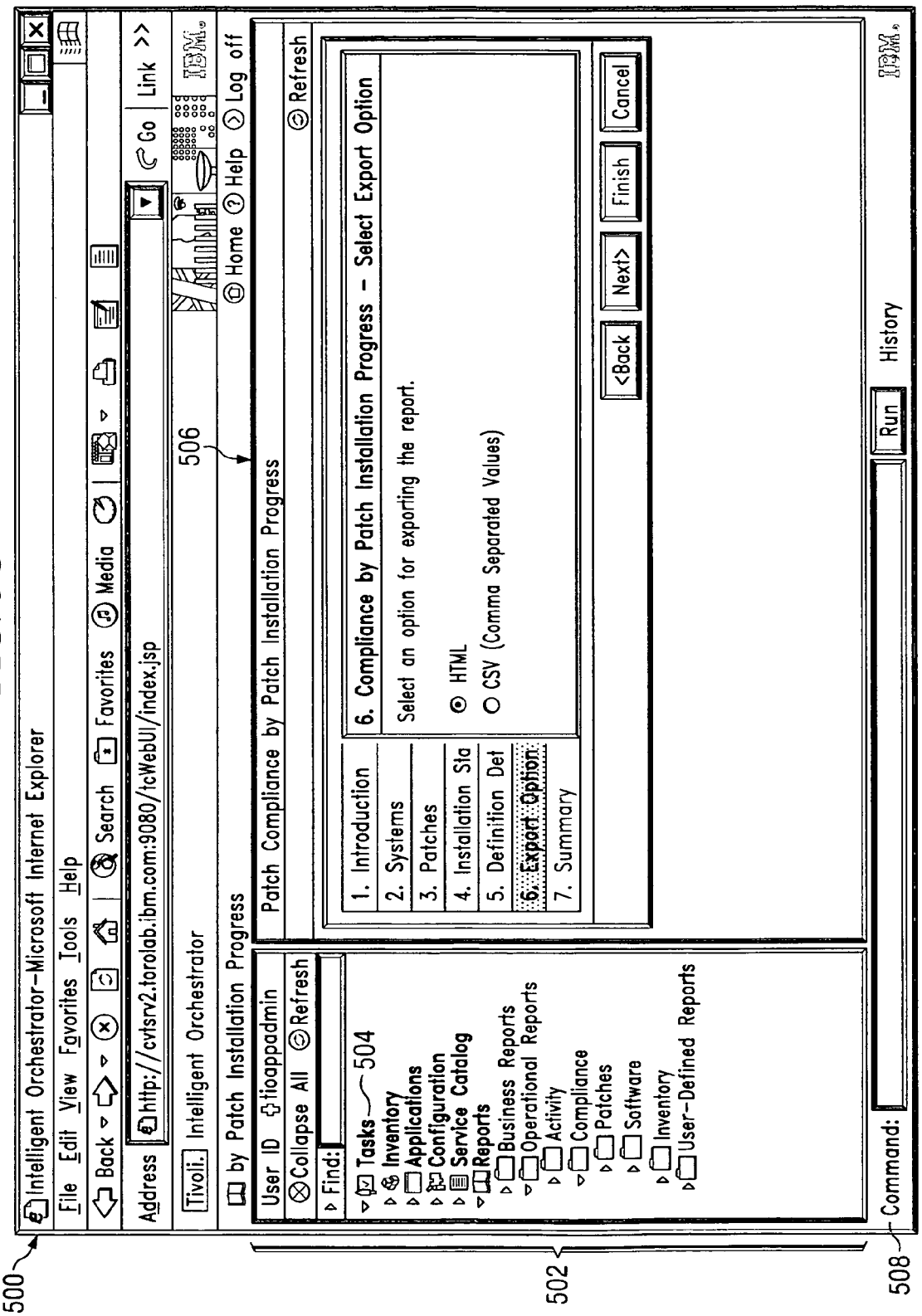
FIG. 5G is a diagram of a graphical user interface for presenting a user with compliance verification status options in accordance with an illustrative embodiment of the present invention.

FIG. 5G is a diagram of a graphical user interface for presenting a user with compliance verification status options in accordance with an illustrative embodiment of the present invention. Second pane 506 of window 500 may allow the user to specify export options. For example, the report may be exported in hypertext markup language (HTML) or in comma separated values (CSV). In another example, the report may be exported as a text or database file so that the results are more easily reviewed or shared.

Figures 1, 5H:
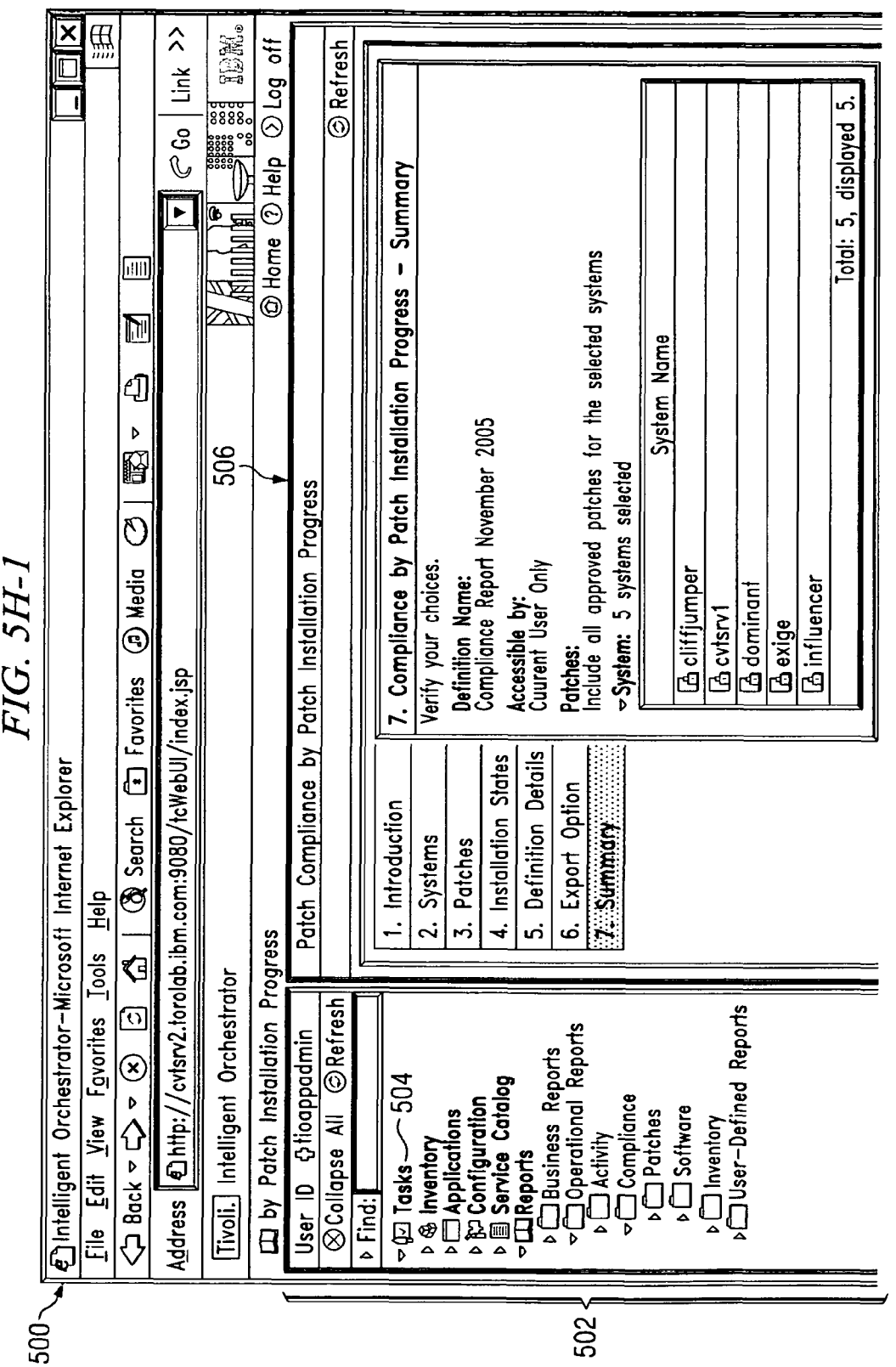

FIG. 5H-1 and FIG. 5H-2 are a diagram of a graphical user interface for presenting a user with compliance verification status information in accordance with an illustrative embodiment of the present invention.

Second pane 506 of window 500 may allow the user to view a summary of those choices and options selected for the specified report. For example, the user may be able to see the named report, accessibility information, applicable patches, selected systems, installation state, and export format.

Figures 1, 5I:
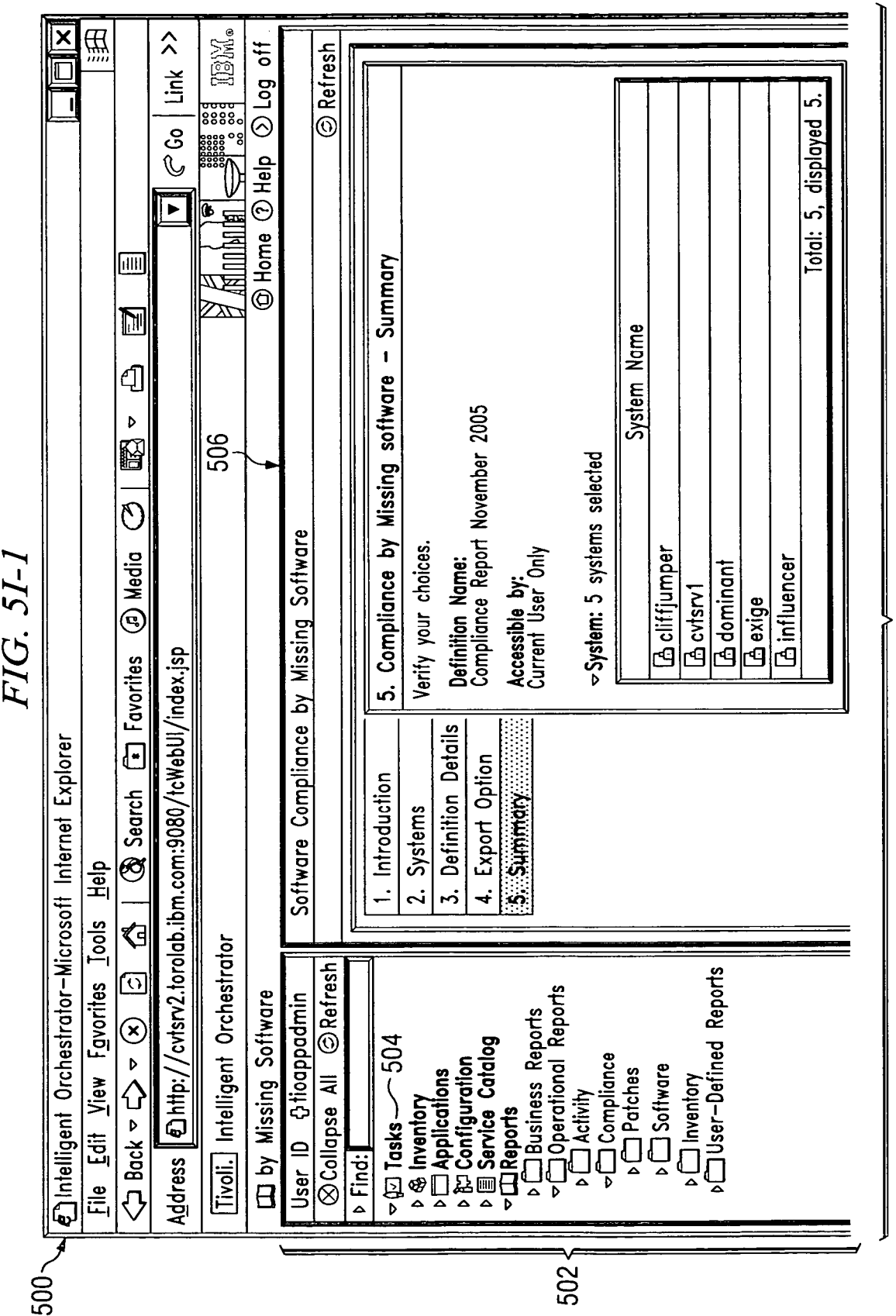

FIG. 5I-1 and FIG. 5I-2 are a diagram of a graphical user interface for presenting a user with compliance verification status information in accordance with an illustrative embodiment of the present invention.

Second pane 506 of window 500 may allow the user to view a summary of missing software. For example, the user may input information in order to submit a missing software query. The missing software query may allow a user to efficiently ascertain which systems are lacking updated software in order to more effectively manage software updates and installation. The summary may specify the name of the report, accessibility information, the systems to be queried, pools to be included, and the export format.

Figure 5J:
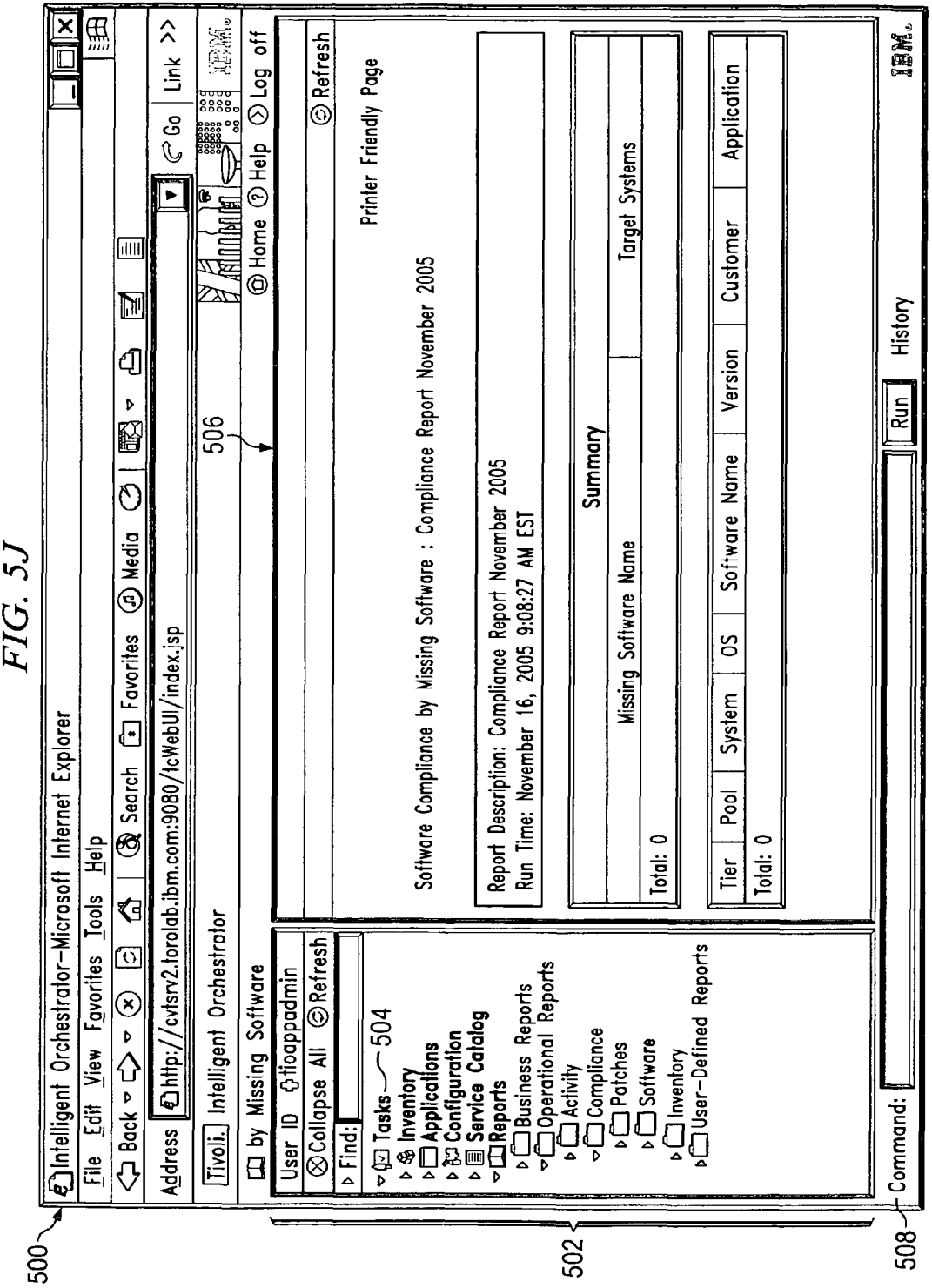
FIG. 5J is a diagram of a graphical user interface for presenting a user with compliance verification status information in accordance with an illustrative embodiment of the present invention.

FIG. 5J is a diagram of a graphical user interface for presenting a user with compliance verification status information in accordance with an illustrative embodiment of the present invention.

Second pane 506 of window 500 may allow the user to view the report. The report may detail those options and criteria previously selected by the user. For example, in response to a missing software query, a report of systems missing software, the names of the systems and additional information may be displayed to the user. The report may be displayed within the software management application or it may be in the form of a separately opened file.

A report may display various information to the user including references, properties, export information, execution history, and execution details. Info may include information regarding transitions and steps taken in the software management process. References may display other software referenced during the management process. Properties may display properties and attributes of the software including, for example, dependencies and associated software drivers. Export may display the export format. Execution history may show the history of the software management process, including, for example, tasks, times and dates, and errors. Execution details may show additional information regarding software management, including information regarding the download, import, distribution, and installation criteria.

Figure 6:
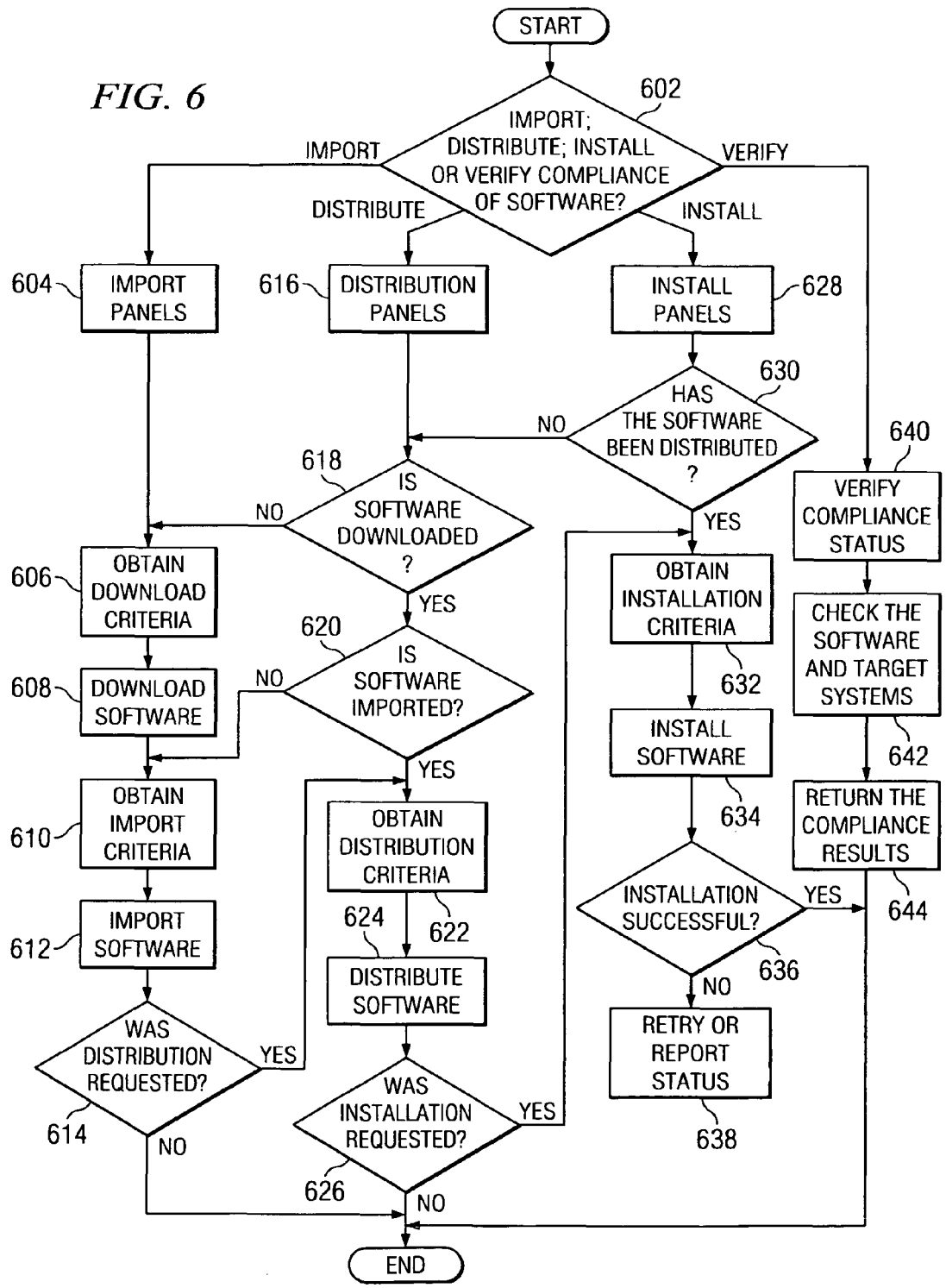
FIG. 6 is a flowchart illustrating the management of software distribution in accordance with an illustrative embodiment of the present invention.

FIG. 6 is a flowchart illustrating the management of software distribution in accordance with an illustrative embodiment of the present invention. The process illustrated in FIG. 6 may be implemented between an external server, a dedicated server for running a software management applications, and a client, such as external server 302, dedicated server 304 running software management application 312, and target clients 306, 308, and 310 of FIG. 3 respectively. Various information and options may be presented using a graphical user interface, such as graphical user interface (GUI) 318 of FIG. 3.

The process begins as a determination is made as to whether to import software, distribute software, install software, or verify compliance of software (step 602). Based on the selection, one of four key segments with differing tasks will be implemented. The four key segments manage software installation from start to finish. Software, as generically referred to, indicates new software, a software patch, or other software updates. The determination made in step 602 is a decision to implement a segment and is based on user input in this illustrative example. A segment is an independent section of software management that is composed of multiple tasks to accomplish the specified segment. Subsequent tasks are implemented after the segment choice is made in order to complete the independent segment that is selected. The determination in step 602 is made from user input collected from a graphical user interface, such as window 400 in FIG. 4. The input received from the user in the steps of the process of FIG. 6 may be received using a command line such as command line 408 of FIG. 4.

The determination made in step 602 may allow the user to select at least one step. As a result, the user may be able to select multiple steps of the software management process. Even though the user may select to perform multiple steps, each step selected may need to be carried out in the proper order or sequentially beginning with importing, distributing, installing, and ending with verifying compliance status. The importing step may include both downloading and importing the software. For example, a user may select to both import and distribute software without proceeding further with the process. The importing step, however, is carried out before the distribution step occurs in these examples.

If the user input is an election to import software in step 602, the process then displays import panels to the user (step 604). The import panels may be displayed on graphical displays, such as import panels 320 of FIG. 3. The import panels may display import information, such as window 400 in FIG. 4B.

Exemplary embodiments allow the user to download and import the upgrade separately. By decoupling, importing, and downloading, a user is assured that all of the software was transferred and is now ready for installation. As a result, all possible software importing and distributing problems may be taken care of before installation begins.

The import panels displayed in step 604 may prompt the user to select and define a file repository to use and associate a device driver with the software package and the software package's properties.

Next, the process obtains various download criteria (step 606). The display criteria may enable the user to locate the software and copy it from a CD, internal website, external website, file transfer protocol, or other storage device whether connected to a network or otherwise. The download criteria of step 606 may be download criteria, such as download criteria 328 of FIG. 3 obtained from the user from a graphical user interface, such as window 400 of FIG. 4C.

The process then downloads the software (step 608). The software may be downloaded to a storage repository, such as storage repository 314 of FIG. 3 outside of the network firewall until imported. The process then prompts the user in order to obtain import criteria (step 610). The import criteria may include, for example, specifying the required installation method, name, and software type. The import criteria allows a network to recognize the software and configure the software for installation on the target clients. For example, the installation method may be determined by the device driver specified in the import criteria. The user may be prompted to enter the appropriate device driver or automatic analysis of the appropriate driver may be implemented to obtain the import criteria. The import criteria of step 610 may be import criteria, such as import criteria 330 of FIG. 3 obtained from the user from a graphical user interface, such as window 400 of FIG. 4C.

The process then imports the software (step 612) using the import criteria. The software may be imported from a storage repository, such as storage repository 314 of FIG. 3 to a dedicated server that runs the software management program, such as dedicated server 304 of FIG. 3 successfully and the software is functioning properly. Software verification may occur as a client, such as target client 306 of FIG. 3 reports to a device housing the software management application, such as dedicated server 304 of FIG. 3. Next, a determination is made as to whether distribution of the software was requested (step 614). The process terminates if distribution was not requested in step 614. Returning again to step 602, if the user input is an election to distribute software, the process displays distribution panels to the user (step 616). The distribution panels of step 616 may be distribution panels, such as distribution panels 322 of FIG. 3 displayed to the user from a graphical user interface, such as window 400 of FIG. 4D. An illustrative embodiment of the present invention allows distribution to be done separately from the other parts of the software management. As a result, a user may send or distribute the specified software to the target systems in preparation for a future install action. This allows better organization because all of the software management tasks are not performed at once. Next, a determination is made as to whether the software is downloaded (step 618). The determination made in step 618 is based on user input in this illustrative example. If the software has not been downloaded in step 618, the process obtains download criteria (step 606). If the software has been downloaded, a determination is made as to whether the software is imported (step 620). If the software is not imported in step 620, the process obtains import criteria (step 610).

If the software has been imported, the process obtains distribution criteria (step 622). The distribution criteria in step 622 may be distribution criteria, such as distribution criteria 332 of FIG. 3 collected from a graphical user interface, such as window 400 of FIG. 4D, FIG. 4E, FIG. 4F, and FIG. 4G. The user may be presented with various options and lists that indicate the distribution criteria. Criteria may include, for example, size and complexity of the software, severity, priority, and software impact. The criteria may also specify the relationship with other software packages, resource pools, libraries, application tiers, and other linked hardware or software. All of these different criteria may be used to determine the optimal time and process that should be used for software deployment.

Additional criteria may be used to incorporate decisions that were previously made. For example, by showing previous approval times, change management records/trouble tickets, and historical distribution data, the user may fine tune the distribution process by indicating criteria based on previous successes or failures. For example, information may suggest that updates performed after 5:00 p.m. are statistically less likely to cause significant errors. Based on this exemplary information, the user may select to perform future distributions only after 5:00 p.m.

After the distribution criteria has been obtained (step 622), the process distributes software (step 624) to the appropriate clients. The clients may be network clients, such as target clients 306, 308, and 310 of FIG. 3. The software is distributed in accordance with the criteria obtained in step 622. Next, a determination is made as to whether the installation was requested (step 626). If installation was not requested, the process terminates.

Returning again to step 614, if distribution was requested, the process continues by obtaining distribution criteria (step 622). Based on data that is defined in the data center model (DCM), advanced distribution workflows can be created. Data center model may be an accessible device for storing information, such as data center model 316 of FIG. 3. Data center model 316 may incorporate the historical data and the hardware and software relationships that are supported by the software management system. The user may elect from a variety of distribution options based on this information. These options may include semi-automatic, automatic, and manual software distribution. The user may also elect options based on postmortem information and historical data. Based on the results of using one option over another over time, the distributions may be monitored to improve efficiency, allowing more flexibility for the users.

Returning again to step 602, if the user input is an election to install the software, install panels are displayed to the user (step 628). The installation panels in step 628 may be displayed on a graphical user interface, such as installation panels 324 of FIG. 3. The installation panels may display installation information, such as window 400 in FIG. 4H. Next, a determination is made as to whether the software has been distributed (step 630). The determination in step 630 may be made automatically or based on input from the user input in this illustrative example. Determining whether the software has been distributed involves looking to the target systems that are to receive the software.

If the software has not been distributed in step 630, the process determines whether the software has been downloaded (step 618). If the software has been distributed, the process obtains installation criteria (step 632). The installation criteria of step 632 may be installation criteria, such as installation criteria 334 of FIG. 3 collected from a graphical user interface, such as window 400 of FIG. 4I, FIG. 4J, FIG. 4K, FIG. 4L, FIG. 4M, and FIG. 4N. Installation criteria provide the terms and conditions of installation. The criteria for installation may include pre-set criteria or may be triggered based on a client user's actions.

For example, installation may be pre-set for immediate installation once distributed. In another example, installation may occur at a scheduled downtime. In another example, the installation may occur when processing usage for the installing system is low for a measured amount of time, such as processor utilization less than 25% for more than thirty minutes. A processor usage or threshold may be specified in terms of utilization percentage and a time period at which the utilization percentage has been below a specified value. The installing user may also specify a time period for all updates or a specific time period for each individual update. The installation may also occur when there are no user initiated processes active on the computing device. A summary of the installation criteria may be displayed to the user on a graphical user interface, such as window 400 of FIG. 4O, and FIG. 4P.

After obtaining the installation criteria (step 632), the software is installed (step 634) according to the criteria. Installation may be directed by an installation script or command, such as installation package 328 from a dedicated server housing the software management application, such as dedicated server 304 of FIG. 3. The installation step may be executed on network clients such as target clients 306, 308, and 310 of FIG. 3. Next, a determination is made as to whether the software is installed successfully (step 636). If the installation is not successful, the process repeats the attempt to install the software and reports the installation status to the administrator and/or individual user (step 638). The report of the installation status in step 638 may be displayed to the user on a graphical user interface, such as window 400 of FIG. 4Q. The status report may affirm that the software was successfully installed on the subsequent attempt or that there is a problem with the installation. If the installation is successful, the process terminates.

Returning again to step 626, if installation was requested, the process obtains installation criteria (step 632). Returning again to step 602, if the user input is an election to verify the compliance status of the software, the process verifies software compliance (step 640). Software verification allows the process and/or user to ensure that installation was completed successfully and the software is functioning properly. Software verification may occur as a client, such as target client 306 of FIG. 3 reports to a device house, the software management application, such as dedicated server 304 of FIG. 3. In another example, the report may automatically occur when installation is completed. Additionally, the process checks the current status of the software (step 642) to determine if updates are needed. Subsequently, the process returns compliance results to the user (step 644) with the process terminating thereafter. The compliance results in step 644 may be displayed to the user on a graphical user interface, such as window 500 of FIG. 5. The compliance results may include listed software versions, time and date of installation, installation statistics, conflicts, and errors encountered during installation.

In one exemplary embodiment of the present invention, the software management steps and options present to the user are presented using a graphical user interface. The user may be able to easily select those actions to undertake by manipulating an icon or graphical symbol, using a drop-down list, entering text, numbers or symbols, checking boxes, and any other means of entering information on a computing device. Additionally, a user may be able to use a search feature to find additional information regarding any aspect of past, present, or future software management tasks. The historical software management information may be retrieved from the data center model. As a new version of software is completed or a segment is finished that information is recorded in the data center model. That information may be retrieved as needed from the data center model. For example, a software patch named "Patch A" may have been distributed to the target clients without yet being installed. The data center model stores the information regarding the distribution of "Patch A" so that later when the administrative user returns to complete installation the information is quickly and easily retrieved by the management application from the data center model.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be (i) an electronic, magnetic, optical, electromagnetic, infrared, or semiconductor system (or apparatus or device) storage medium (ii) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing a software installation using a software installation application program, the computer implemented method comprising:
   displaying a graphical user interface for receiving user input to manage the software installation using the software installation application program having a plurality of software installation tasks, wherein a user is presented with a plurality of screens on the graphical user interface, including a screen dedicated to each one of the plurality of software installation tasks; and
   responsive to receiving a selection of a particular software installation task from the plurality of software installation tasks, initiating the particular software installation task;
   responsive to receiving a selection of an option for execution of the particular software installation task, customizing performance of the particular software installation task based on the selection of the option; and
   wherein at least one of the plurality of software installation tasks may be scheduled and initiated independently from others of the plurality of software installation tasks, and wherein the particular software installation task is a distributing software installation task that sends the software to a plurality of remote clients for installation of the software on the plurality of remote clients, and wherein the graphical user interface comprises a task status screen that displays status of the particular software installation task run on each of the plurality of remote clients.

2. The computer implemented method of claim 1, wherein the displaying step comprises:
   initiating a process that solicits the user input to manage the software installation using the plurality of screens, wherein a subsequent screen is selected based on prior user input in a prior screen.

3. The computer implemented method of claim 1, wherein the plurality of software installation tasks comprise a plurality of segments which comprise import, distribute, install, and verify compliance status tasks, wherein the verify compliance status task is operable to verify that the software is installed and is functioning properly, and whether updates to the software are needed.

4. The computer implemented method of claim 3, wherein the plurality of segments are executed sequentially, beginning with the import, followed by the distribute, then followed by the install, and ending with the verify compliance status.

5. The computer implemented method of claim 1, wherein another particular software installation task selected from the plurality of software installation tasks is an importing software installation task and wherein the initiating software installation task comprises:
   obtaining download criteria from the user using the graphical user interface; and
   downloading the software using the download criteria.

6. The computer implemented method of claim 5, wherein the distributing software installation task comprises:
   determining if the software has been downloaded and imported;
   responsive to determining that the software has not been downloaded and imported, invoking the importing software installation task;
   responsive to determining that the software has been downloaded and imported, obtaining distribution criteria from the user using the graphical user interface; and
   distributing the software using the distribution criteria.

7. The computer implemented method of claim 6, wherein the distributing software installation task is any of an automatic distribution, semi-automatic distribution, or manual distribution.

8. The computer implemented method of claim 6, wherein another particular software installation task selected from the plurality of software installation tasks is an installing software installation task and wherein the installing software installation task comprises:
   determining if the software has been distributed;
   responsive to determining that the software has not been distributed, invoking the distributing software installation task;
   responsive to determining that the software has been distributed, obtaining installation criteria; and
   installing the software using the installation criteria.

9. The computer implemented method of claim 8, wherein the user provides the installation criteria.

10. The computer implemented method of claim 8, wherein the installing software installation task further comprises:
    responsive to determining that installing was not successful, retrying the installing step and reporting an installation status.

11. The computer implemented method of claim 8, wherein the installing software installation task is triggered by a user action of the user or pre-set criteria as established by an administrative user.

12. The computer implemented method of claim 11, wherein the pre-set criteria is selected from a group consisting of a scheduled time, a processor utilization below a specified threshold, and a software distribution to the client.

13. The computer implemented method of claim 1, wherein another particular software installation task selected from the plurality of software installation tasks is a verifying compliance status software installation task and wherein the verifying compliance status software installation task comprises:
    checking the software on client systems to verify that the software is installed and is functioning properly, and whether updates to the software are needed to form compliance results; and
    returning the compliance results.

14. The computer implemented method of claim 1, wherein the software installation is selected from a group consisting of a new software application, a software update, and a software patch.

15. The computer implemented method of claim 1, wherein the user input is received from an administrative user.

16. A system comprising:
    an external server;
    a dedicated server operably connected to the external server, wherein a software management application running on the dedicated server displays a graphical user interface for receiving user input to control the software management application having a plurality of software installation tasks, wherein the software management initiates a particular software installation task in response to the user input, wherein the dedicated server downloads the software from the external server to a storage repository operably connected to the dedicated server, wherein the dedicated server saves information regarding an inventory of hardware and software elements of the clients in a data center model, and wherein the particular software installation task may be scheduled and initiated independently from others of the plurality of software installation tasks; and at least one client operably connected to the server wherein the dedicated server distributes the software to the at least one client when the at least one selection includes distributing software, and wherein the software is installed on the at least one client in response to an installation package being sent from the dedicated server to the at least one client.

17. The system of claim 16, wherein the plurality of software installation tasks comprise tasks for importing, distributing, installing, and verifying compliance status of software.

18. A computer program product comprising a computer usable storage medium including computer usable program code stored on the computer usable storage medium for managing software distribution using a software installation application program, said computer program product including:

computer usable program code for displaying a graphical user interface for receiving user input to manage the software installation using the software installation application program having a plurality of software installation tasks, wherein a user is presented with a plurality of screens on the graphical user interface, including a screen dedicated to each one of the plurality of software installation tasks;

computer usable program code responsive to receiving a selection of a particular software installation task from the plurality of software installation tasks, for initiating the particular software installation task;

computer usable program code responsive to receiving a selection of an option for execution of the particular software installation task, for customizing performance of the particular software installation task based on the selection of the option; and wherein at least one of the plurality of software installation tasks may be scheduled and initiated independently from others of the plurality of software installation tasks, and wherein the particular software installation task is a distributing software installation task that sends the software to a plurality of clients for installation of the software on the plurality of remote clients, and wherein the graphical user interface comprises a task status screen that displays status of the particular software installation task run on each of the plurality of remote clients.

19. The computer program product of claim 18, wherein the plurality of software installation tasks comprise:

computer usable program code responsive to determining that importing was requested, for
obtaining download criteria from the user using the graphical user interface;
downloading the software using the download criteria;
obtaining import criteria from the user using the graphical user interface;
importing the software using the import criteria;

computer usable program code responsive to determining that the software distribution was requested, for
obtaining distribution criteria from the user using the graphical user interface;
distributing the software using the distribution criteria;

computer usable program code responsive to determining that the installation was requested, for
obtaining installation criteria from the user using the graphical user interface;
installing the software using the installation criteria;

computer usable program code responsive to determining that installing was not successful, for retrying the installing step or reporting an installation status; and computer usable program code responsive to determining that the verifying compliance status was requested, for
checking the software on target systems to verify that the software is installed and is functioning properly, and whether updates to the software are needed to form compliance results; and
returning the compliance results.

* * * * *